United States Patent [19]
Geist

[11] Patent Number: 5,329,598
[45] Date of Patent: Jul. 12, 1994

[54] METHOD AND APPARATUS FOR ANALYZING CHARACTER STRINGS

[75] Inventor: Jon C. Geist, Olney, Md.

[73] Assignee: The United States of America as represented by the Secretary of Commerce, Washington, D.C.

[21] Appl. No.: 911,698

[22] Filed: Jul. 10, 1992

[51] Int. Cl.$^5$ .............................................. G06K 9/00
[52] U.S. Cl. ...................................... 382/39; 382/40; 382/57
[58] Field of Search ............................ 382/39, 57, 40

[56] References Cited

U.S. PATENT DOCUMENTS

| | | | |
|---|---|---|---|
| 4,355,371 | 10/1982 | Convis et al. | 364/900 |
| 4,471,459 | 9/1984 | Dickenson et al. | 364/900 |
| 4,580,241 | 4/1986 | Kucera | 364/900 |
| 4,654,875 | 3/1987 | Srihari et al. | 382/40 |
| 4,730,269 | 3/1988 | Kucera | 364/900 |
| 4,783,758 | 11/1988 | Kucera | 364/900 |
| 4,799,271 | 1/1989 | Nagasawa et al. | 382/57 |
| 4,903,206 | 2/1990 | Itoh et al. | 364/419 |
| 4,979,227 | 12/1990 | Mittelbach et al. | 382/57 |

Primary Examiner—Leo H. Boudreau
Attorney, Agent, or Firm—Stephen J. Roe

[57] ABSTRACT

A method for automatically identifying and correcting errors in electronically stored character strings input from handwritten character strings is disclosed. The input character strings are compared to a predetermined list of correct character strings by dividing the input character string and each of the correct character strings into at least one character string fragment. Each character string fragment or set of character string fragments is formed by applying at least one different fragmentation submethod to the character string. The corresponding fragments from the input character string and the correct character strings are then compared in turn. The correct character string producing a unique lowest comparison value is determined to be the correct character string intended by the input character string. Accordingly, the determined correct character string is output in place of the input character string.

21 Claims, 20 Drawing Sheets

HANDWRITING SAMPLE FORM

| NAME | DATE | CITY | STATE | ZIP |
|---|---|---|---|---|
|  | 7/3/89 | Cheboygan, | Mi | 49721 |

This sample of handwriting is being collected for use in testing computer recognition of hand printed numbers and letters. Please print the following characters in the boxes that appear below.

| 0123456789 | 0123456789 | 0123456789 |
|---|---|---|
| 0123456789 | 0123456789 | 0123456789 |

| 00 | 101 | 2753 | 42440 | 069665 |
|---|---|---|---|---|
| 00 | 101 | 2753 | 42440 | 069665 |

| 732 | 2344 | 91407 | 957562 | 31 |
|---|---|---|---|---|
| 732 | 2344 | 91407 | 957562 | 31 |

| 4409 | 96183 | 373988 | 96 | 888 |
|---|---|---|---|---|
| 4409 | 96183 | 373988 | 96 | 888 |

| 47762 | 198788 | 72 | 239 | 3355 |
|---|---|---|---|---|
| 47762 | 198788 | 72 | 239 | 3355 |

| 079565 | 06 | 150 | 4112 | 82615 |
|---|---|---|---|---|
| 079565 | 06 | 150 | 4112 | 82615 | l f y o c q k z j m b x g d u v e r w i s n h a t p l f y o c q k z j m b x g d u v e r w i s n h a t p

KPCANDJRNWYHFQLIBSUOEKVTZG

KPCANDJRmWYHFQLIBSUOEKVTZG

Please print the following text in the box below:
We, the People of the United States, in order to form a more perfect Union, establish justice, insure domestic Tranquility, provide for the commen defense, promote the general Welfare, and secure the Blessings of Liberty to ourselves and our posterity, do ordain and establish this Constitution for the United States of America.

We, the People of the United States, in order to form a more perfect Union, establish justice, insure domestic Tranquility, provide for the commen defense, promote the general Welfare, and secure the Blessings of liberty to ourselves and our posterity, do ordain and establish this Constitution for the United States of America.

FIG. 1

|    | A | B | C | D | E | F | G | H | I | J | K | L | M | N | O | P | Q | R | S | T | U | V | W | X | Y | Z | & |
|----|---|---|---|---|---|---|---|---|---|---|---|---|---|---|---|---|---|---|---|---|---|---|---|---|---|---|---|
| 01 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2  | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 3  | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 |
| 4  | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 05 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 6  | 0 | 0 | 1 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 7  | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 8  | 1 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 9  | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 1 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 1  | 0 | 0 | 1 | 0 | 0 | 0 | 0 | 0 | 0 | 0 | 1 | 0 | 0 | 0 | 1 | 0 | 0 | 0 | 0 | 0 | 0 | 0 | 0 | 0 | 0 | 0 | 0 |
| 2  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3  | 0 | 0 | 1 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 4  | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 |
| 15 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7  | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8  | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 |
| 9  | 0 | 0 | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1  | 0 | 0 | 1 | 0 | 0 | 0 | 0 | 0 | 0 | 0 | 1 | 0 | 0 | 0 | 1 | 0 | 0 | 0 | 0 | 0 | 0 | 0 | 0 | 0 | 0 | 0 | 0 |
| 2  | 1 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 3  | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 25 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6  | 1 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 7  | 0 | 0 | 1 | 0 | 0 | 0 | 0 | 0 | 0 | 0 | 1 | 0 | 0 | 0 | 1 | 0 | 0 | 0 | 0 | 0 | 0 | 0 | 0 | 0 | 0 | 0 | 0 |
| 8  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9  | 0 | 0 | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 |
| 1  | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|    | A | B | C | D | E | F | G | H | I | J | K | L | M | N | O | P | Q | R | S | T | U | V | W | X | Y | Z | & |

FIG.9A

|    | A | B | C | D | E | F | G | H | I | J | K | L | M | N | O | P | Q | R | S | T | U | V | W | X | Y | Z | & |
|----|---|---|---|---|---|---|---|---|---|---|---|---|---|---|---|---|---|---|---|---|---|---|---|---|---|---|---|
| 01 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2  | 0 | 0 | 0 | 0 | 0 | 0 | 0 | 0 | 0 | 0 | 0 | 0 | 0 | 1 | 0 | 0 | 0 | 0 | 0 | 0 | 0 | 1 | 0 | 0 | 0 | 0 | 0 |
| 3  | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4  | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 05 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 6  | 0 | 0 | 1 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 7  | 1 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 8  | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9  | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 1 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 1  | 0 | 0 | 1 | 0 | 0 | 0 | 0 | 0 | 1 | 0 | 0 | 1 | 0 | 0 | 0 | 0 | 0 | 0 | 0 | 0 | 0 | 0 | 0 | 0 | 0 | 0 | 0 |
| 2  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3  | 0 | 0 | 1 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 4  | 0 | 0 | 0 | 0 | 0 | 0 | 0 | 0 | 0 | 0 | 0 | 0 | 1 | 0 | 0 | 0 | 0 | 0 | 0 | 0 | 1 | 0 | 0 | 0 | 0 | 0 | 0 |
| 15 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7  | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8  | 0 | 0 | 0 | 0 | 0 | 0 | 0 | 0 | 0 | 0 | 0 | 0 | 1 | 0 | 0 | 0 | 0 | 0 | 0 | 0 | 0 | 1 | 0 | 0 | 0 | 0 | 0 |
| 9  | 0 | 0 | 1 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1  | 0 | 0 | 1 | 0 | 0 | 0 | 0 | 0 | 0 | 0 | 1 | 0 | 0 | 0 | 1 | 0 | 0 | 0 | 0 | 0 | 0 | 0 | 0 | 0 | 0 | 0 | 0 |
| 2  | 1 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 3  | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 25 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6  | 1 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 7  | 0 | 0 | 1 | 0 | 0 | 0 | 0 | 0 | 1 | 0 | 0 | 1 | 0 | 0 | 0 | 0 | 0 | 0 | 0 | 0 | 0 | 0 | 0 | 0 | 0 | 0 | 0 |
| 8  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9  | 0 | 0 | 1 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 1 | 0 | 0 | 0 | 0 | 0 | 0 | 0 | 0 | 0 | 1 | 0 | 0 | 0 | 0 | 0 |
| 1  | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG.9B

|    | A | B | C | D | E | F | G | H | I | J | K | L | M | N | O | P | Q | R | S | T | U | V | W | X | Y | Z | & |
|----|---|---|---|---|---|---|---|---|---|---|---|---|---|---|---|---|---|---|---|---|---|---|---|---|---|---|---|
| 01 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2  | 0 | 0 | 0 | 0 | 0 | 0 | 0 | 0 | 0 | 0 | 0 | 1 | 1 | 0 | 0 | 0 | 0 | 0 | 0 | 0 | 1 | 0 | 0 | 0 | 0 | 0 | 0 |
| 3  | 0 | 0 | 1 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 | 0 |
| 4  | 0 | 0 | 1 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 05 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7  | 1 | 0 | 0 | 0 | 0 | 0 | 0 | 0 | 0 | 0 | 0 | 0 | 1 | 0 | 0 | 0 | 0 | 0 | 0 | 0 | 1 | 0 | 0 | 0 | 0 | 0 | 0 |
| 8  | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 1 | 0 | 0 | 0 | 0 | 0 | 0 | 0 | 1 | 0 | 0 | 0 | 0 | 0 | 0 |
| 1  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4  | 0 | 0 | 0 | 0 | 0 | 0 | 0 | 0 | 0 | 0 | 0 | 0 | 1 | 0 | 0 | 0 | 0 | 0 | 0 | 0 | 1 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8  | 0 | 0 | 0 | 0 | 0 | 0 | 0 | 0 | 0 | 0 | 0 | 0 | 1 | 0 | 0 | 0 | 0 | 0 | 0 | 0 | 1 | 0 | 0 | 0 | 0 | 0 | 0 |
| 9  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2  | 0 | 0 | 0 | 0 | 0 | 0 | 0 | 0 | 0 | 0 | 0 | 0 | 1 | 0 | 0 | 0 | 0 | 0 | 0 | 0 | 1 | 0 | 0 | 0 | 0 | 0 | 0 |
| 3  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6  | 0 | 0 | 0 | 0 | 0 | 0 | 0 | 0 | 0 | 0 | 0 | 0 | 1 | 0 | 0 | 0 | 0 | 0 | 0 | 0 | 1 | 0 | 0 | 0 | 0 | 0 | 0 |
| 7  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 0 | 1 | 0 | 0 | 0 | 0 | 0 | 0 | 0 | 1 | 0 | 0 | 0 | 0 | 0 | 0 |
| 1  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|    | A | B | C | D | E | F | G | H | I | J | K | L | M | N | O | P | Q | R | S | T | U | V | W | X | Y | Z | & |

FIG.9C

|    | A | B | C | D | E | F | G | H | I | J | K | L | M | N | O | P | Q | R | S | T | U | V | W | X | Y | Z | & |
|----|---|---|---|---|---|---|---|---|---|---|---|---|---|---|---|---|---|---|---|---|---|---|---|---|---|---|---|
| 01:| 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 05:| 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 6: | 0 | 0 | 1 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 7: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9: | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10:| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1: | 0 | 0 | 1 | 0 | 0 | 0 | 0 | 0 | 0 | 0 | 1 | 0 | 0 | 1 | 0 | 0 | 0 | 0 | 0 | 0 | 0 | 0 | 0 | 0 | 0 | 0 | 0 |
| 2: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3: | 0 | 0 | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| 4: | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 15:| 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7: | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8: | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 9: | 0 | 0 | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| 20:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1: | 0 | 0 | 1 | 0 | 0 | 0 | 0 | 0 | 0 | 0 | 0 | 1 | 0 | 0 | 1 | 0 | 0 | 0 | 0 | 0 | 0 | 0 | 0 | 0 | 0 | 0 | 0 |
| 2: | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3: | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 25:| 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6: | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 7: | 0 | 0 | 0 | 1 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 8: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9: | 0 | 0 | 0 | 1 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 30:| 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 1: | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

|   | A | B | C | D | E | F | G | H | I | J | K | L | M | N | O | P | Q | R | S | T | U | V | W | X | Y | Z | & |
|---|---|---|---|---|---|---|---|---|---|---|---|---|---|---|---|---|---|---|---|---|---|---|---|---|---|---|---|
| A: | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| B: | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| C: | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| D: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| E: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| F: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| G: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| H: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| I: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| J: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| K: | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 |
| L: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| M: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| N: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| O: | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| P: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| R: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| S: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| U: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| W: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| X: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Y: | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| Z: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| &: | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| : | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| : | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| : | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| : | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| : | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|   | A | B | C | D | E | F | G | H | I | J | K | L | M | N | O | P | Q | R | S | T | U | V | W | X | Y | Z | & |

FIG.11B

|   | A | B | C | D | E | F | G | H | I | J | K | L | M | N | O | P | Q | R | S | T | U | V | W | X | Y | Z | & |
|---|---|---|---|---|---|---|---|---|---|---|---|---|---|---|---|---|---|---|---|---|---|---|---|---|---|---|---|
| A: | 0 | 0 | 0 | 0 | 0 | 0 | 0 | 0 | 0 | 0 | 1 | 0 | 0 | 0 | 0 | 0 | 0 | 0 | 0 | 1 | 0 | 0 | 0 | 0 | 0 | 0 | 0 |
| B: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| C: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| D: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| E: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| F: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| G: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| H: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| I: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| J: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| K: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| L: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| M: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| N: | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 | 0 |
| O: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| P: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| R: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| S: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| U: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| W: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| X: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Y: | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| Z: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| &: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| : | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| : | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| : | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| : | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| : | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|   | A | B | C | D | E | F | G | H | I | J | K | L | M | N | O | P | Q | R | S | T | U | V | W | X | Y | Z | & |

FIG.11C

|   | A | B | C | D | E | F | G | H | I | J | K | L | M | N | O | P | Q | R | S | T | U | V | W | X | Y | Z | & |
|---|---|---|---|---|---|---|---|---|---|---|---|---|---|---|---|---|---|---|---|---|---|---|---|---|---|---|---|
| A:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| B:| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| C:| 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| D:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| E:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| F:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| G:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| H:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| I:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| J:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| K:| 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| L:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| M:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| N:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| O:| 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| P:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| R:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| S:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| U:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| W:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| X:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Y:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Z:| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| &:| 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|  :| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|  :| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|  :| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|  :| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|  :| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|   | A | B | C | D | E | F | G | H | I | J | K | L | M | N | O | P | Q | R | S | T | U | V | W | X | Y | Z | & |

FIG. 11D

METHOD AND APPARATUS FOR ANALYZING CHARACTER STRINGS

BACKGROUND OF THE INVENTION

1. Field of the Invention

The present invention relates to a method and apparatus for analyzing character strings generated by optical character recognition of handwritten character strings.

2. Description of Related Art

One of the primary demands for optical character recognition (OCR) is as a method to replace keypunching or hand entry of information from forms that were filled out by hand. Much of the information from these forms consists of words or character strings that are chosen from a list that is either explicitly defined for or implicitly known by the person filling out the forms.

One example of such a form is the list of various diseases that are explicitly stated or implicitly known to a person when completing an insurance application form. Another example comprises much of the information on the United States Census Form. One particular example from the United States Census Form is the ethnic background section, especially the implicit list of native American Indian tribes.

When trying to identify words read from forms that have been filled out by hand, problems beyond the normal spelling errors occur, and the error rate is much greater than for OCR of machine printed characters. When attempting to form optical character recognition of even reasonably clearly printed machine character strings, an OCR system will create insertion, deletion, substitution and segmentation errors. These normal OCR errors are compounded by normal handwriting errors. These errors include poorly formed letters, nonstandard orientations, poor spacing between letters, and the normal variety in the types of pens and pencils used to write with.

Conventional word identification methods are quite sensitive to deletions, insertions and segmentation errors at various locations in character strings. Examples of such prior art methods are the methods used to verify spelling implemented with many word processors. However, the various method developed for checking the spelling in word processing and other applications are oriented towards identifying misspellings based on human typographical and cognitive errors.

For example, U.S. Pat. Nos. 4,730,269 and 4,580,241 to Kucera et al. discloses a method for transforming a misspelled word into a word skeleton by replacing letters with a general phonetic equivalent. Such a system is useless in attempting to correct OCR generated misspellings, as OCR errors have no relationship to the cognitive human errors discoverable by the phonetic skeleton scheme of Kucera et al.

Another example is U.S. Pat. No. 4,903,206 to Itoh et al., which discloses a method for ensuring that the correct character string for a misspelled character string is in a selected list of possible correct character strings chosen from a larger dictionary. The method of Itoh et al. assumes (correctly for typographical and cognitive errors) that characters having the lowest frequency of use have the highest probability of being correct. Such an assumption makes the method useless in correcting OCR-generated errors, as the likelihood of a character being incorrectly included or excluded from an OCR-generated character string is dependent upon the way an individual prints.

These methods can identify any number of possible words to replace the misspelled word when the misspelling is caused by typing or cognitive errors. However, few of these methods can positively identify the correct word even when the spelling errors are rather minor, and they have great difficulty with common OCR errors.

SUMMARY OF THE INVENTION

An object of the present invention is to provide a method for positively identifying a correct character string from an original uncorrected character string. It is also an objective of the present invention to provide an apparatus which is able to determine the correct character strings quickly and accurately. A further object of the invention is to provide information to a human operator to assist him in determining the correct character string when the method is unable to positively identify the correct character string. Another object of the present invention is to automatically insert the correct character string in place of the uncorrected character string. An additional object of the present invention is to provide a method that is able to detect different types of errors with differing sensitivities depending on the subset of the method used. A final object of the present invention is to provide a method and apparatus for identification and correction of uncorrected character strings highly efficiently by using a highly parallel computer architecture implementation.

To achieve the above objects in the method and apparatus according to the present invention, the uncorrected character string is divided into at least one set of character string fragments. One set of uncorrected character string fragments is generated for each submethod implemented by the general method. In addition, each of the predetermined (allowed) correct character strings are, or have already been divided into a plurality of sets of correct character string fragments. At least one correct character string fragment is generated for each correct character string provided for each submethod implemented. A comparison of corresponding character string fragments is made and an error value determined for each corresponding pair of fragments and a partial error total for the submethod generated.

Each submethod implemented is relatively insensitive to different types of possible error. The lowest partial error value of all the different submethods is then determined as the total error for that character string. The correct character string having the lowest total error value and being under a threshold value is determined to be the correct character string and is inserted for the uncorrected character string. It is also desirable to use the output of one submethod as the input to another submethod if the correct word is not identified by the first submethod.

To achieve the above objects in the apparatus according to the present invention, a massively parallel computer (MPC) architecture is used. Two special purposes systolic processors (SPS) are used to control the inputs to and the outputs from the MPC.

BRIEF DESCRIPTION OF THE DRAWINGS

The preferred embodiment of the present invention will be described in detail with reference to the accompanying drawings in which:

FIG. 1 is a copy of a form which is filled in by hand.

FIGS. 9A-9C are representation of the data planes of the first preferred embodiment of the comparison step.

FIG. 9D is representative of the data planes of the second preferred embodiment of the comparison step.

FIGS. 11A-11D are representation of the data planes of the third preferred embodiment of the comparison step.

Figure 2A:
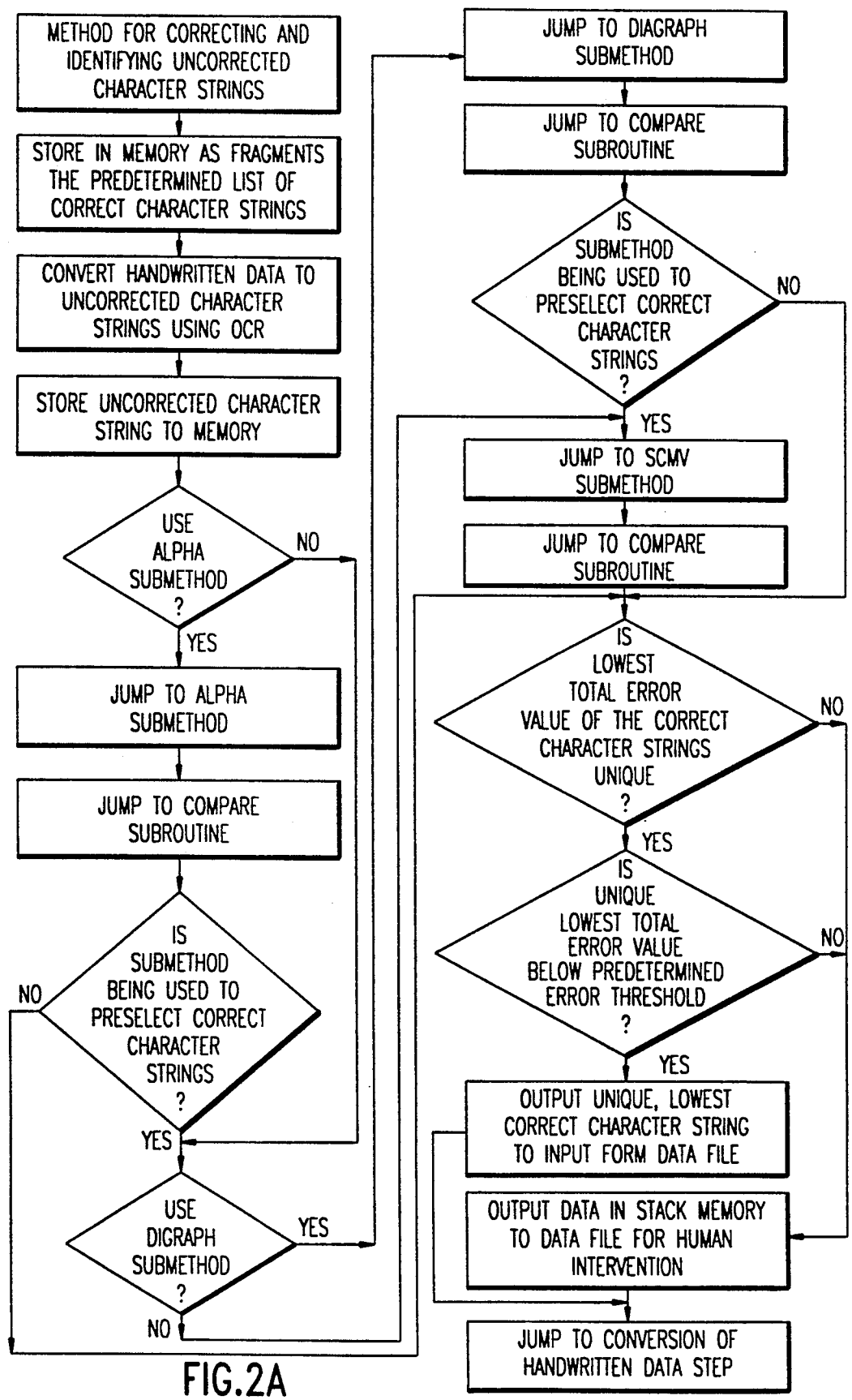
FIGS. 2A-2B is a flow chart of the preferred embodiment of the identifying and correcting method.

Appendix I is a printout from a trial run of the first preferred embodiment on a list of possibly misspelled character strings.

Appendix II is a printout from a trial run of the second preferred embodiment on a list of possibly misspelled character strings.

Appendix III is a printout from a trial run of the third preferred embodiment on a list of possibly misspelled character strings.

DESCRIPTION OF THE PREFERRED EMBODIMENTS

The method and apparatus embodying the present invention will be described hereinafter with reference to FIGS. 1-13 and Appendices I-III.

As shown in the sample handwriting form of FIG. 1, a person is required to complete the form by hand. One such actual example of this is the Census question which requires identifying which, if any, Indian tribe the person belongs to. Because the list is long, the allowed answers to the questions cannot be provided on the form. Appendices I-III each show a truncated list of correct character strings and simulated OCR errors for demonstration purposes. However, in comparison to the vocabulary of the English language, the number of permissible answers to the question is rather limited. Also, the list of predetermined correct character strings often contain multiple words that should be treated as a single word, which is not the case in a conventional English-language dictionary. For example, Iowa Iroquois is included in the sample list as "IOWAIRIQUOIS". This list of permitted answers defines the "correct character strings". Because this list of correct character strings can be predetermined based on the question, it can be prestored in electronic data form.

To further improve the efficiency of the method, the list of correct character strings are stored in fragment form. That is, the predetermined submethods to be used on these forms are applied to the list of correct character strings, and the resulting fragments are stored in memory as fragment sets. When performing the comparison step, the previously generated fragments for each correct character string are loaded directly into the comparison means.

As can also be seen in FIG. 1, the handwritten answer to the question requesting the person's handwriting contains poorly formed letters, improper spacing, and other common handwriting traits. Because these traits, though common, are non-standard, they are an important source of optical character recognition errors.

These errors include substitution, insertion, deletion, transposition and segmentation. Substitution errors are caused by replacing one of the correct letters in a character string with an incorrect letter. Looking at line 4 of Appendix I, the test string "yrikara" is a substitution error misspelling of "arikara", wherein the leading "a" is replaced by a "y".

An insertion error is caused by placing an extra letter into a correct character string. Looking at line 46 of Appendix I, the test string "nocotka" is an insertion error misspelling of "nootka" wherein a "c" has been inserted between the first and second "o".

A deletion error is caused by removing a letter from a correct character string. On line 50 of Appendix I, the test string "seinole" is a deletion error misspelling of the correct string "seminole" wherein the "m" between the first "e" and the "i" has been deleted.

A transposition error is caused by reversing or scrambling the order of two or more correct characters in a character string. These errors, while quite common in handwriting, are actually quite rare in OCR systems.

A segmentation error is caused by a combination of two or more of the above-type errors. For example, on line 5 of Appendix I, the test string "bayock" shows a substitution-deletion segmentation error. In this error, for the correct string "bannock". The first "n" has been substituted with "y" and the second "n" has been deleted. A substitution-addition segmentation error, for example, is shown in line 15 of Appendix I. The correct character string "cree" has been misspelled as "wtree". In this misspelling, the incorrect character "w" has been substituted for the correct character "c" while an incorrect character "t" has been inserted. A substitution-transposition segmentation error is shown, for example, on line 11 of Appendix II. The correct character string "chinook" has been misspelled "chinokw". In this misspelling, the incorrect character "w" has been inserted for the second "o", then this incorrect character "w" was transposed with the correct character "k". Alternatively, this can also be viewed as a deletion-insertion segmentation error, where the second "o" has been deleted, and the "w" has been inserted.

Figure 12:
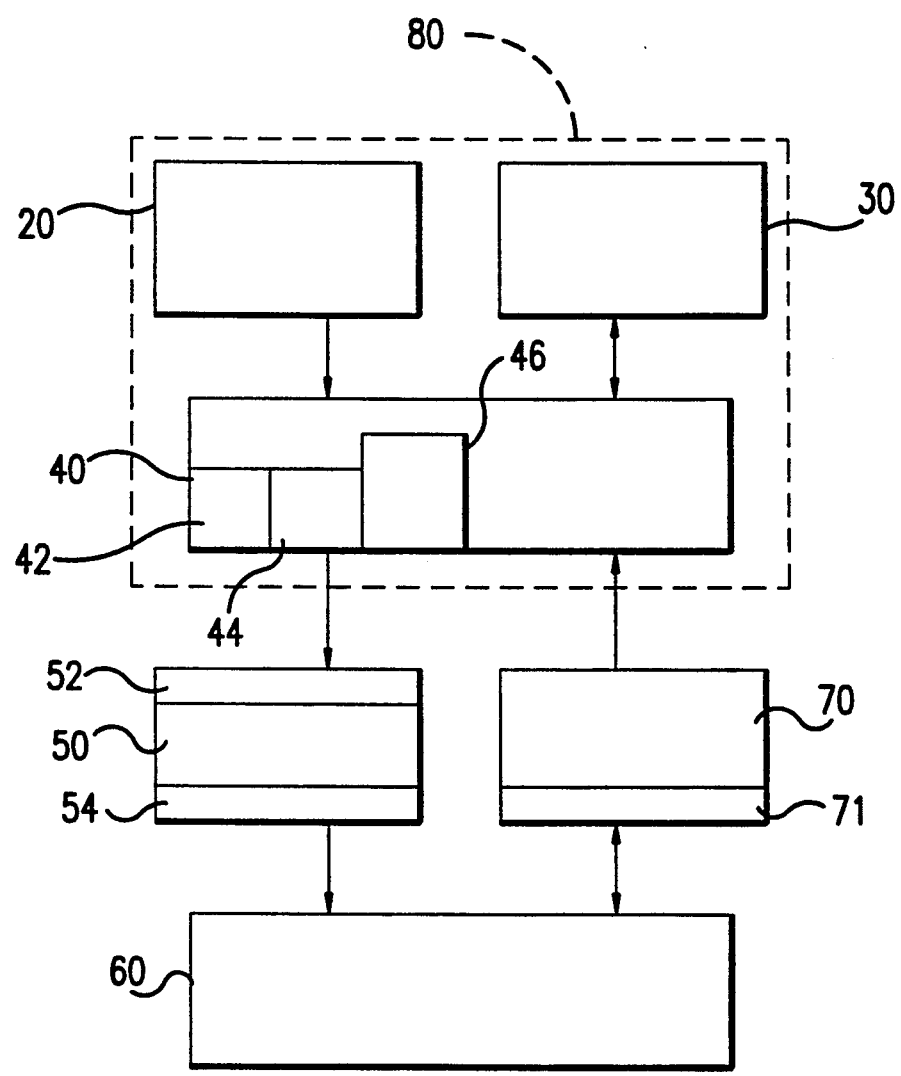
FIG. 12 is a block diagram of the apparatus of the present invention.

In the first preferred embodiment of the apparatus, a host OCR system 80 is connected to a massive parallel computer (MPC) 60 through a first systolic processor structure (SPS1) 50 and a second systolic processor structure (SPS2) 70, as shown in FIG. 12. In conventional optical character recognition (OCR) systems, the OCR can be implemented using either hardware or software systems. The host OCR system 80 is implemented using a general purpose computer 40, a scanner 20 and a special purpose massively parallel processor (MPP) 30 implementing the OCR. Alternatively, the OCR can be implemented in software in the general purpose computer 40. In the preferred embodiment of the apparatus, either system of OCR is preferred.

In the preferred embodiment, a form such as that shown in FIG. 1 is presented to the scanner 20, which generates a serial data signal and transmits it to the general purpose computer 40. The serial data signal is representative of a bitmap of the handwriting sample form of FIG. 1. The general purpose computer 40 stores the data transmitted from the scanner 20 into a first memory area 42. The general purpose computer 40 then transmits the bitmap data to the MPP 30 which converts the bitmap data into uncorrected character strings. The MPP 30 then transmits the uncorrected character strings back to the general purpose computer 40 which stores them in the first memory area 42. Alternatively, the general purpose computer 40 could convert the bitmap data to uncorrected character string data using the general purpose microprocessor 46.

The general purpose computer 40 then generates character string fragments from the uncorrected character strings and transmits them to SPS1 50. Additionally, the general purpose computer 40 also transmits the correct character string fragments to the SPS1 50. The correct character string fragments are predetermined, and have been previously stored into a second memory area 44.

The SPS1 50, SPS2 70 and massively parallel computer 60 are all organized with a generally planar architecture. In the planar architecture MPC 60, the memory registers and processors are each organized into a two-dimensional M×N dimensional array of elementary structures. Each $M_i$, $N_j$ array point of the memory and register arrays stores one bit, and acts as the input or output source for the $M_i$, $N_j$ one-bit processors.

In addition a limited number of machine instructions exist to copy the bit pattern in one memory or register array into another memory or register array or to set the bits in a memory or register dependent upon the bit patterns in another memory register array. Most machine instructions of the MPC 60 execute in one or two clock cycles, and none take more than a few clock cycles.

The special purpose systolic processors 50 and 70 are designed so that the output register plane 54 of SPS1 50 and input register plane 71 of SPS2 70 have the same architecture as the register planes of MPC 60. This allows the contents of the SPS1 50 output register 54 to be transmitted to the MPC register planes in a minimal number of clock cycles. Likewise, a register plane of MPC 60 can output its content to the SPS2 70 input register plane 71 in a minimum number of clock cycles.

Figure 13:
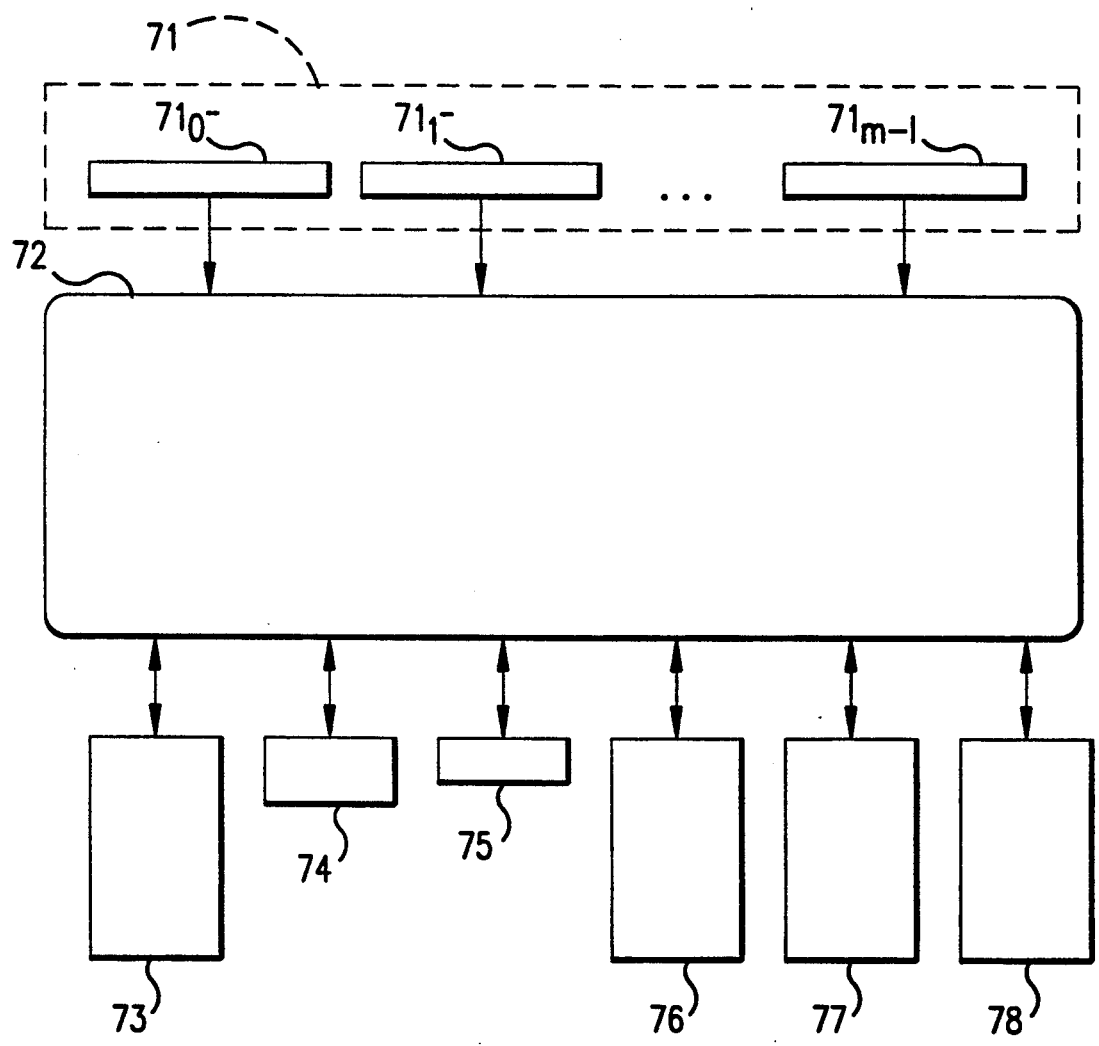
FIG. 13 is a block diagram of the SPS2 of FIG. 12.

The memory and register planes in an SPS are organized into a one-dimensional array of bits as in a conventional serial computer, as shown in FIG. 13. The input register plane 71 of the SPS2 70 is divided into M one-dimensional arrays of N bits each. However, the data stored in these arrays are not interpreted as binary representation of numbers.

The processors 56 and 72 of SPS1 50 and SPS2 70 are organized into a two-dimensional array of one-bit processors which use the one-dimensional memory and register arrays as input and output sources. All of the one-bit processors in the processor array need not be the same type of processor or carry out the same type of function. Generally, however the nth processor of each row will be performing the same function. In operation, the first column of each row of processors in the processor array takes its input from one of the one-dimensional memory or register arrays, and outputs to the next processor in the row. At each clock cycle, the output of each column of processors becomes input to the next or downstream column of processors, until the last processor of each row outputs the data to a memory or register array. In this manner, the SPS1 50 is able to convert the corrected and uncorrected character string fragments from the character data form used by the general purpose computer 40 to the planar architecture form used by the MPC 60, as shown in FIGS. 9a or 9b. Likewise, the SPS2 70 can convert the planar data form used by the MPC 60 to information in a form usable by the general purpose computer 40.

FIG. 13 shows a preferred embodiment of SPS2. The input register plane 71, which receives its data from the MPC consist of M registers each having N bits. Each of the M registers of register plane 71 gets its input directly from a corresponding row register of the MPC 60. The systolic processor 72 consists of W rows (W≧M), each row having Z one-bit processors connected serially. Output register banks 73-78 act as output registers for the systolic processor 72. Register banks 73, 76, 77 and 78 each have M registers. Output register bank 74 has at least M/m registers, where m is equal to the number of fragments formed per character string. Output register bank 75 has one register. In operation, the data output from the MPC 60 is stored in the input register plane 71. After some additional number of clock cycles $T_A$, the register bank row $73_j$ (j=0 to M−1) contains the sums of all of the one bits that were in the input register $71_j$ at t=0. After some additional number of clock cycles $T_B$, the kth register bank row $74_k$ (k=0 to [(M/m)−1]) contains the sum of the register bank rows $73_j$, where j=k*m to ([k+1]*m)−1. After some number of clock cycles $T_C$, the output register 75 contains the sum of all of the register bank rows of register bank 74 input at a time $T=T_A+T_B+T_C$ clock cycles earlier. The output registers 76-78 are register stacks which contain the coded memory addresses of the input set that produced a lowest or greatest bit counts in one of the other registers. In the preferred embodiment, the memory is coded based on the number of clock cycles corresponding to the register bank having the least (or greatest) values since the systolic processor 72 last received a register enable signal. Each of the register banks 76-78 are enabled separately. Output register 76 stores the coded memory addresses corresponding to the output register bank 73, while register bank 77 corresponds to output register bank 74, and output register bank 78 corresponds to output register 75.

In the first preferred embodiment of the method, information from a form, such as a census form or insurance form, has been completed by hand. The requested information in the provided space is input into electronic data storage by scanning the form to provide a signal output indicative of the handwritten character string. The signal is then provided to an optical character recognition system (OCR) to convert the scanner signal to an uncorrected character string representative of the handwritten character string.

The optical scanner 20 converts the entire form into a bitmap pattern. For instance, the zero bits of the bitmap represent a 0.05 mm by 0.05 mm white space on the form, while the one bits represent a 0.05 mm by 0.05 mm black space. The location of each bit in the bitmap corresponds to the location of the white or black space on the form. This bitmap pattern is transmitted by a scanner 20 to the general purpose computer 40. The OCR system then converts the bitmap pattern into an uncorrected character string by isolating a bit field where the handwritten answer to a question has been provided (field isolation), dividing the bit field into one subfield for each character (segmentation) and designating a character from an allowed set of characters to each subfield (recognition). This uncorrected character string may differ in any of the various ways described above from the intended handwritten character string.

This uncorrected electronic character string is then stored in a memory or a register. Preferably, the correct character strings are already stored in memory in alphabetical order. However, the correct character strings can be stored in any manner whatsoever, so long as each one is able to be selected exactly once per comparison to the uncorrected character string.

At this point, the uncorrected character string is divided into at least one character string fragment set. Each of the at least one fragment sets is formed by applying a different predetermined character string fragmentation submethod to the uncorrected character string and each fragmentation set consists of at least one character string fragment. Each set of uncorrected character string fragments is then stored in a memory or a register or transmitted to the comparison means.

To compare the uncorrected character string fragments with the corrected character string fragments, the uncorrected character string fragments for the uncorrected character string are loaded into a first data plane of the comparison means. The fragment sets of the current correct character string are copied from memory and loaded into corresponding locations on a second data plane of the comparison means. As each predetermined character string fragment of a set is compared to the corresponding uncorrected character string fragment of the corresponding set, an error value is generated indicative of the difference between the characters present in the correct character string fragment and the characters present on the uncorrected character string fragment.

For each set of fragments, a partial value indicative of the total difference between the uncorrected character string as fragmented and the corrected character string as fragmented is generated. Then the lowest partial value of the partial values generated for each pair of character string fragment sets is determined to be the total value for the difference between the uncorrected character string and the current correct character string.

The first such current correct character string (or its address pointer) along with its total value is then stored in memory, and the next correct character string is selected, and the process repeated. As the total value for each succeeding correct character string is determined, the total value of the current correct character string is compared to the total value of the lowest previous correct character string. A current correct character string or address pointer having a lower or equal total value is also saved in memory. In the preferred embodiment, a stack memory is provided, wherein new lower values are pushed onto the top of the stack, and old higher values are dropped off the bottom. The stack memory may be any number of layers thick, and should be selected depending on the number of possible correct character strings being used, and the overall similarity of the correct character strings. For lists of correct character strings like the one used here, as for example in Appendix I, and for most short lists, a stack memory of 5 levels is preferred. For longer lists, larger stacks are desirable.

Once all of the correct character strings have been compared to the uncorrected character string, a determination is made whether the lowest total value is unique. If the lowest total value is not unique, (that is, if two or more correct character strings have generated the same lowest total value) then no automatic correction to the uncorrected character string is possible. If the lowest total value is determined to be unique, and it is determined to be higher than a predetermined threshold value, again no automatic correction to the uncorrected string is possible. When the lowest total value is both unique and below or equal to the threshold value, then the uncorrected character string is replaced by the correct character string and the correct character string is transferred to an output device, such as a non-volatile storage device, a printer, a monitor, or the like.

When a unique lowest correct character string is found, it is transferred to the output device, and all the other data on the stack is abandoned. If a unique and low threshold character string is not found, the data from the stack is either transferred to an output device for current, on-line interactive operator determination of the correct character string, or to a storage device for later off-line operator determination of the correct character string, or stored for use as a new shortened list of correct character strings or address pointers for another of the submethods being described herein.

Figure 8:
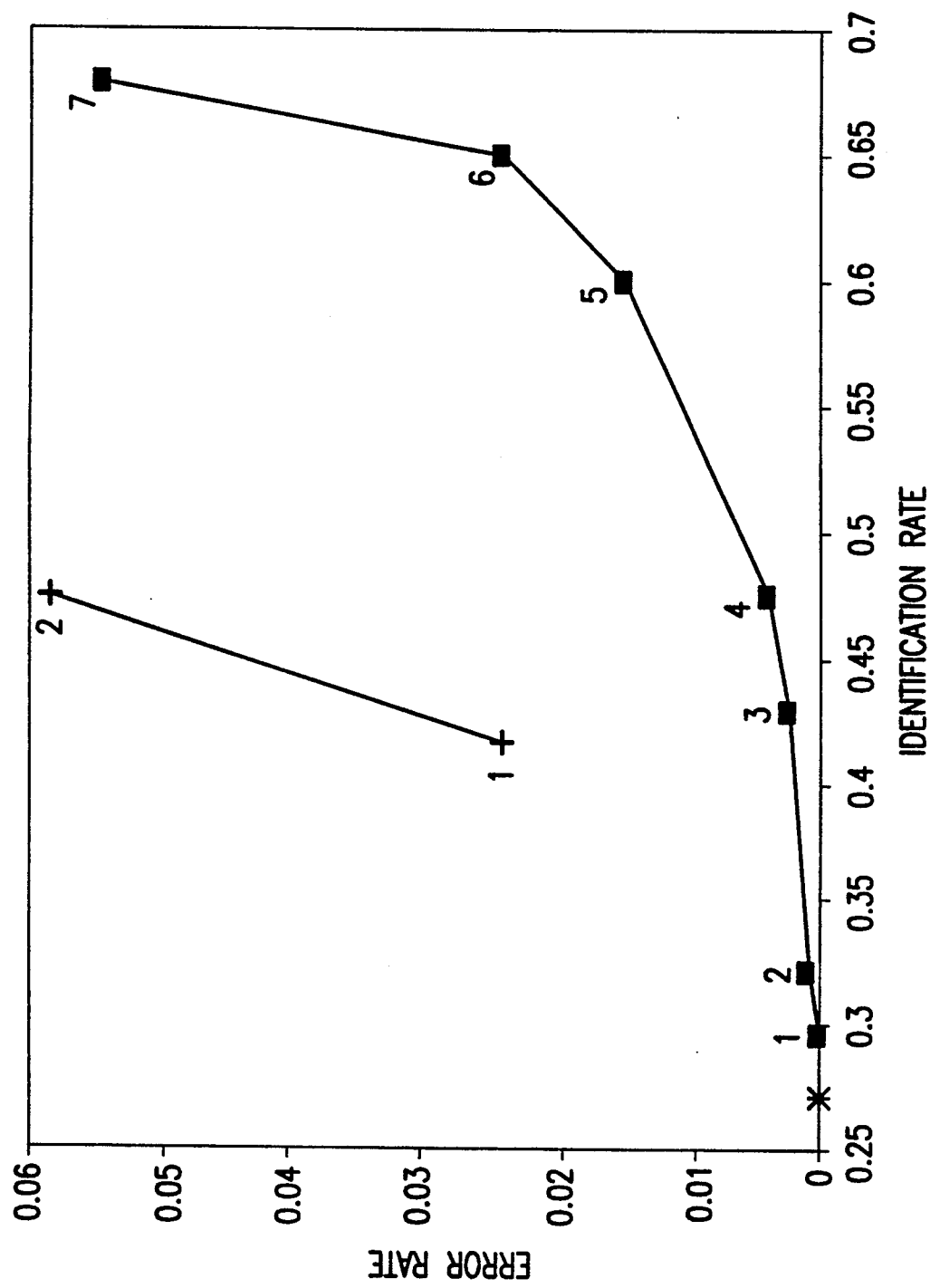
FIG. 8 is a graphical representation of the percentage of identified and corrected character strings against the error threshold value using the first preferred embodiment.
Figure 10:
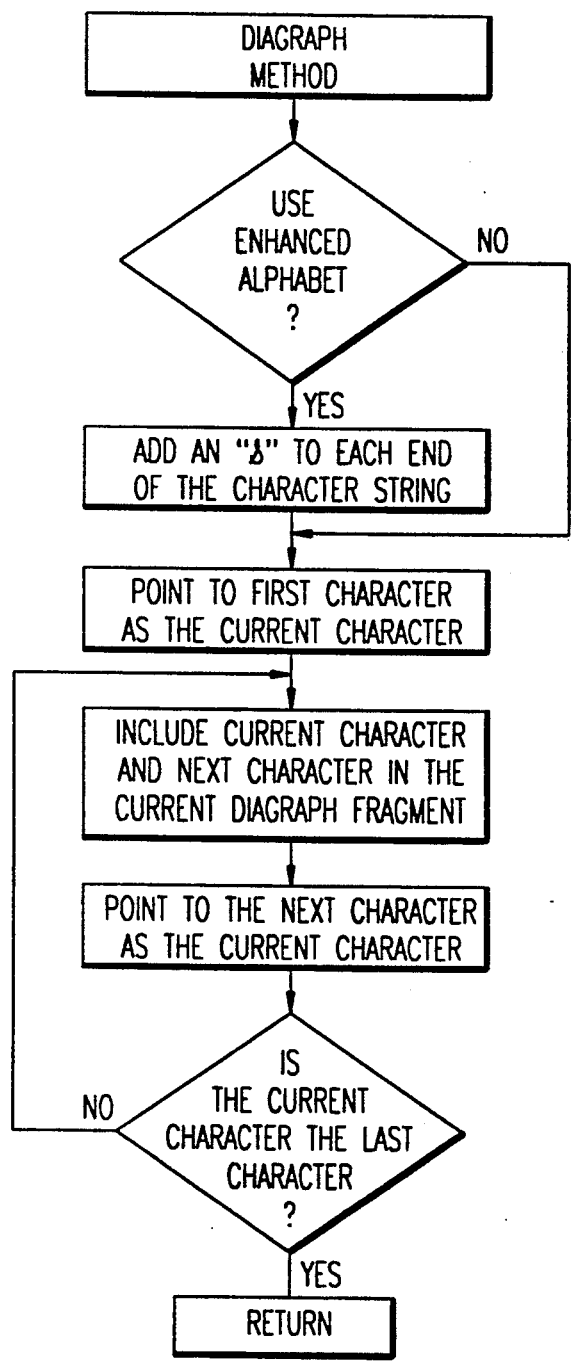
FIGS. 10 is a flow chart of the Digraph sub-method.

Selection of the threshold value is a trade-off between maximizing the number of total corrections made and minimizing the number of erroneous corrections substituted. FIG. 8 shows that for the list provided and the fragmentation submethods of FIGS. 3-6, a threshold value of 5 provides an appropriate ratio of corrections to errors, if an error rate of 2% can be tolerated.

In a first preferred embodiment of the step of generating character string fragments from character strings, the actual order of the characters in the fragment is not important. Accordingly, in the first preferred embodiment of the character string fragments, the characters within each fragment are stored in alphabetical order. It is also unimportant whether one or more of the same character appear in any one fragment. Accordingly, all duplicate characters in any fragment are eliminated.

In the first preferred embodiment, four different fragmentation submethods are employed, and each fragmentation submethod divides the character strings into at most four character string fragments. If a character string would divide into more than four fragments, all of the fragments beyond four are disregarded.

In addition, the accuracy of the preferred submethods depends on the absolute number of characters on the string. Accordingly, character strings of at least 7 characters are preferred. If a string has less than 7 characters, characters within the character string are duplicated.

Preferably, the beginning characters are added onto the end of the string, but any method of adding additional characters will work. Additionally, fragmentation schemes which provide for minimum numbers of fragments, a fixed number of fragments or an unlimited number of fragments will also work with the preferred submethods.

In the first preferred embodiment, implementing four fragmentation submethods, the four submethods are:

the single consonant, multiple vowel (SCMV) submethod;

the single vowel, multiple consonant (SVMC) submethod;

the multiple consonant, multiple vowel (MCMV) submethod; and the multiple vowel, multiple consonant (MVMC) submethod.

In the first preferred embodiment of the fragmentation step, it is preferred to apply the four submethods both from the beginning of the four strings and from the ends of the strings, for a total of 8 sets of character fragments of 4 fragments each for a total of 32 fragments. In the examples set forth below, only front to end conversions are illustrated.

Figure 3:
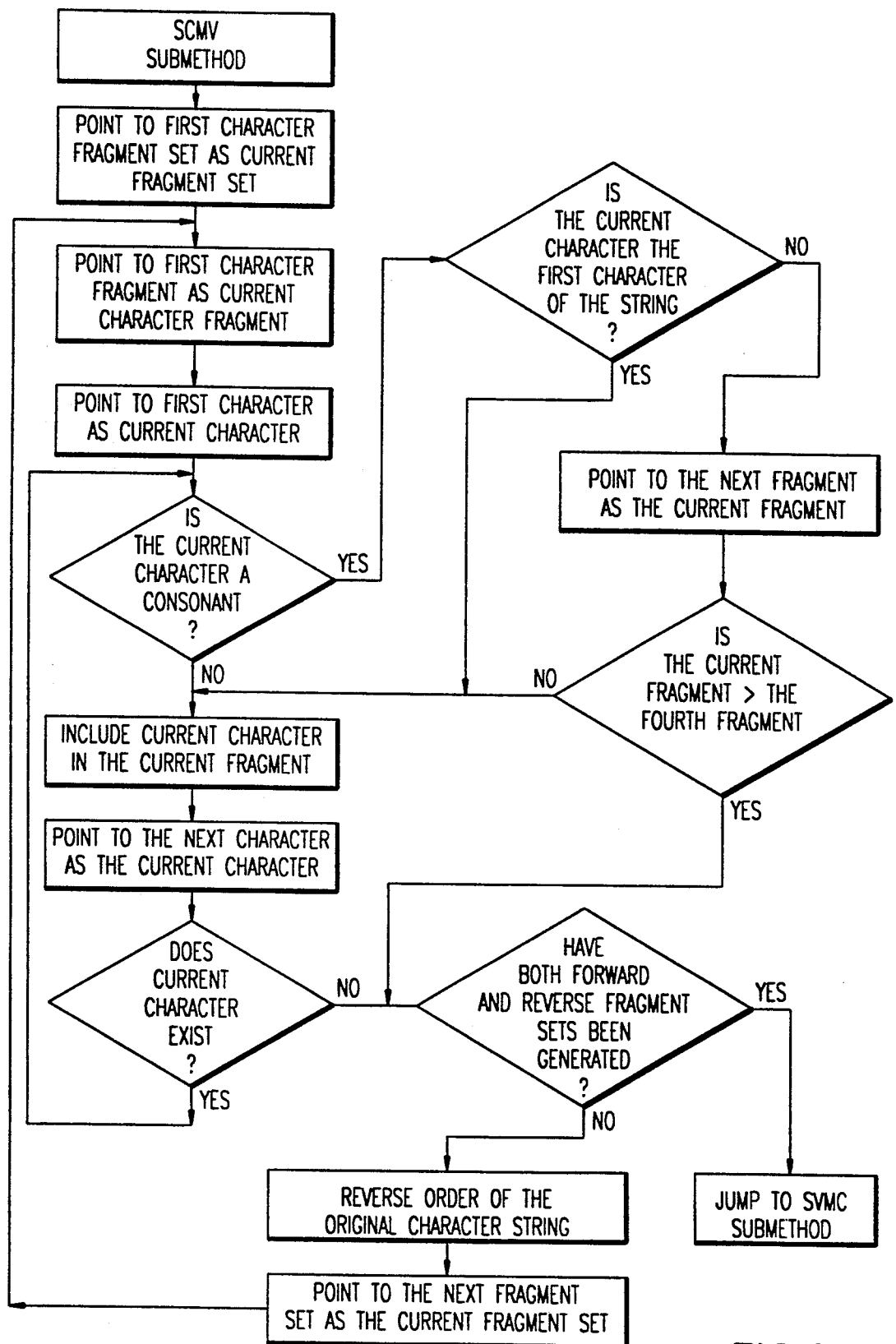
FIG. 3 is a flow chart of the SCMV submethod.

The SCMV submethod shown in FIG. 3 is based on providing character string fragments which have at most a single consonant and may have any number of vowels. The SCMV submethod works by taking a character string and placing characters from the string in the first fragment until the first consonant is found. That consonant then begins the next fragment and the characters of the character string are placed into the second fragment until the next consonant is found. Each fragment is then formed in the same manner until at most four fragments are formed. Of course, should the character string begin with a consonant, the first character string would include that consonant and any following characters until the next consonant is found.

For example, to fragment the correct character string "bannock" using the SCMV submethod, the first fragment will consist of the letters "ab". Because "bannock" begins with a consonant, the first fragment includes the consonant and the following vowel. The next fragment includes the next consonant "n" and no other characters as a consonant immediately follows. The third fragment then consists of the next consonant and the following vowel "no". The fourth and last fragment then consists of the consonant "c". The consonant "k" is not included because it would form the fifth fragment. The characters are stored in alphabetical order, as the particular order which they would appear in the fragment is irrelevant, as shown in rows 1-4 of FIG. 9A.

Figure 4:
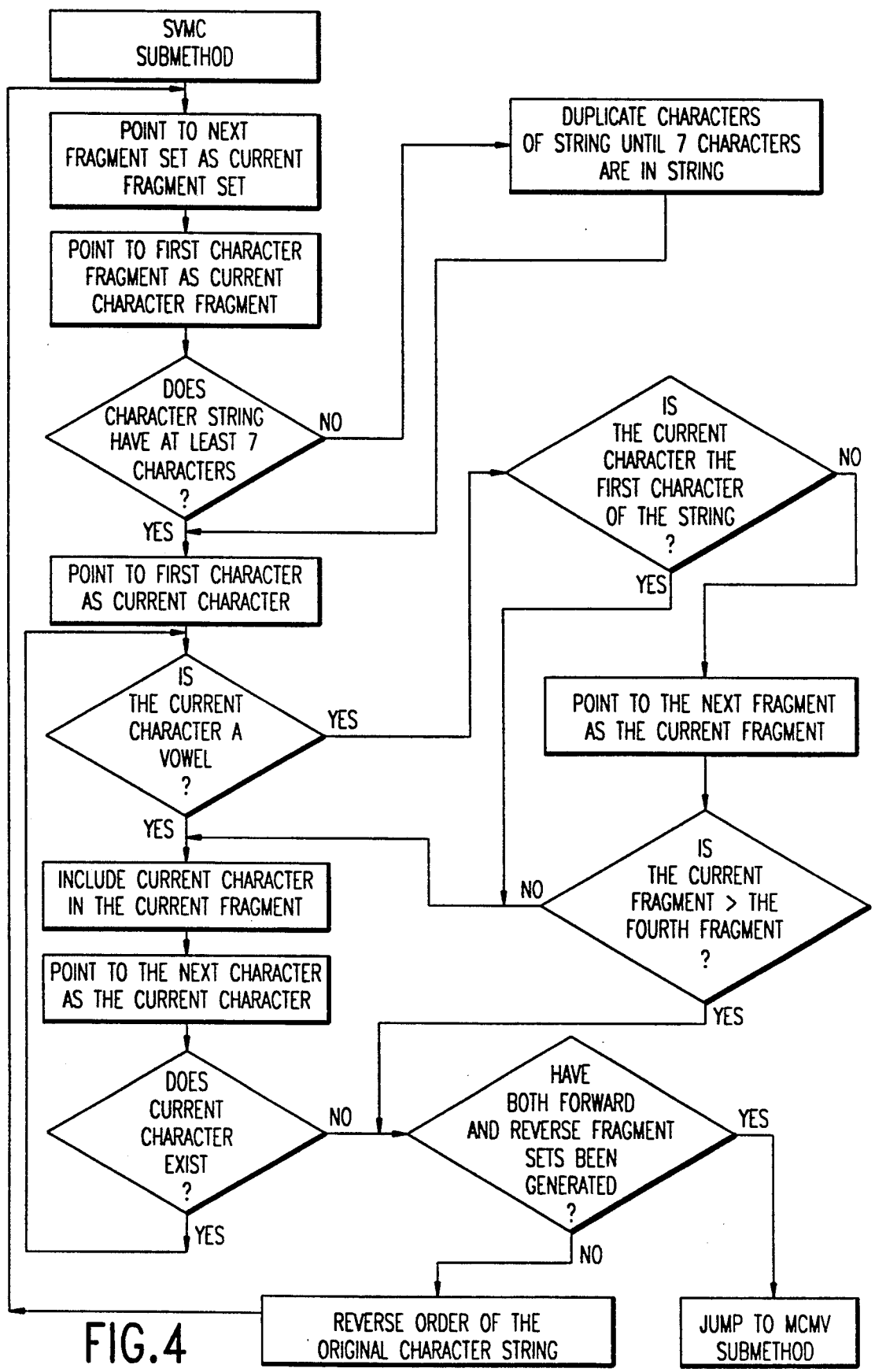
FIG. 4 is a flow chart of the SVMC submethod.

The SVMC submethod shown in FIG. 4 is based on providing character string fragments which have at most a single vowel while they may have any number of consonants. Under the SVMC submethod, character string fragments are formed by placing the characters of the character string into the first fragment until the first vowel is found. That vowel then begins the second character string fragment. The characters of the character string are placed in the second fragment until the next vowel is found. The process is then repeated to form the remaining character string fragments. Of course if the character string begins with a vowel, the first vowel and any following consonants are placed in the first fragment.

For example, taking the correct character string "bannock" and applying the SVMC submethod to it to generate character string fragments, the first fragment consist of the consonant "b". The second fragment consist of the characters "ann". However, since the character "n" is duplicated, and only a single example of each character is necessary, the second "n" is deleted. The third fragment then consists of the characters "cko". Because all of the characters of the string have been placed into a fragment, the forth fragment is left empty. Again, the characters are stored in alphabetical order, and not the order in which they appeared in the character string, as shown in rows 9-12 of FIG. 9A.

Figure 5:
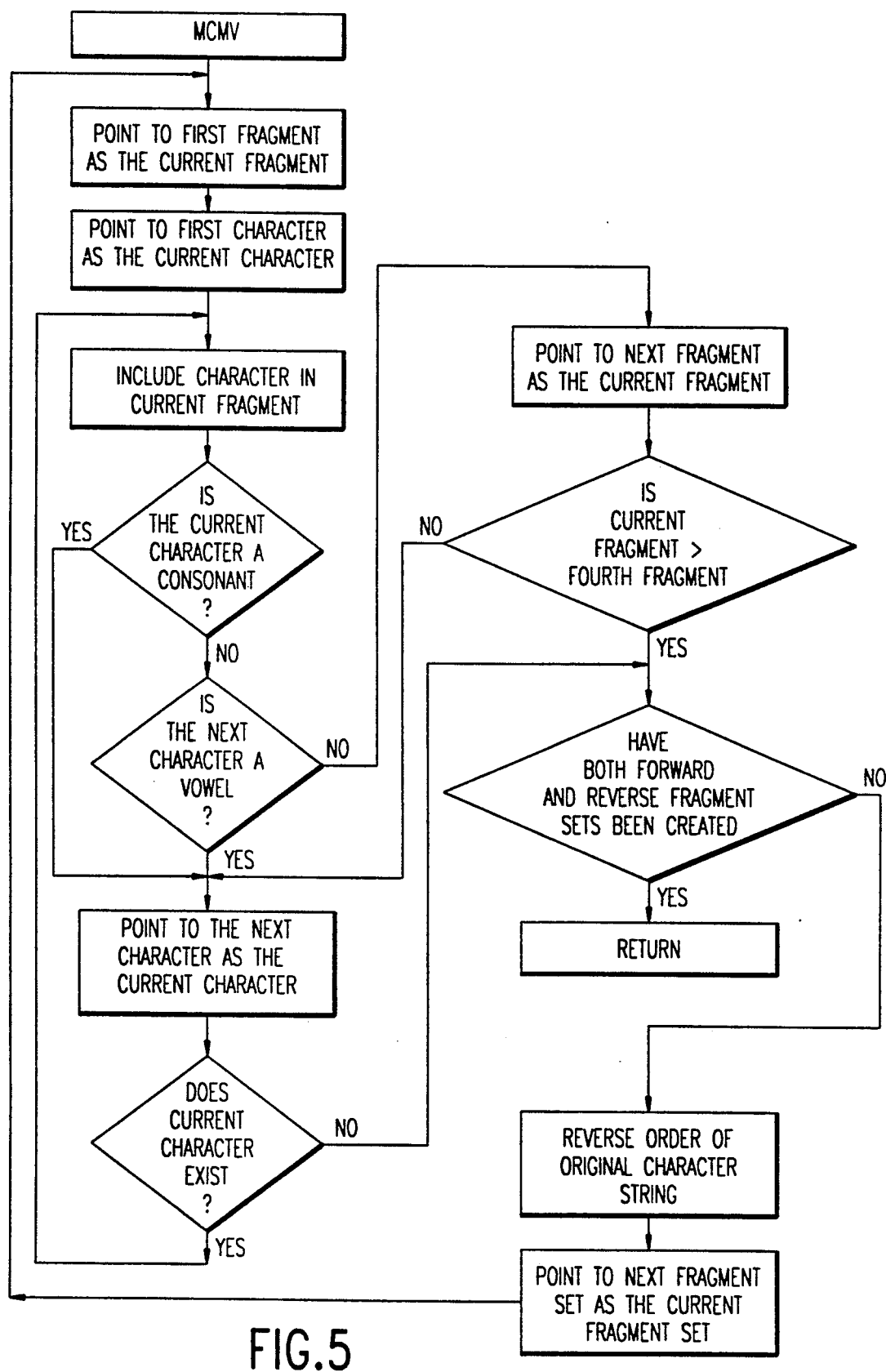
FIG. 5 is a flow chart of the MCMV submethod.

The MCMV submethod shown in FIG. 5 is based on providing character string fragments which group into single fragment strings of consecutive consonants, and any number of vowels following the consonants. The fragments are formed by placing the characters of the character string into the first fragment until a vowel followed by a consonant is found. The vowel is then placed into the current fragment and the next fragment is begun with a consonant. The characters of the character string are then placed into the second character string fragment until the next vowel-consonant combination is found. The combination is divided as above, and the rest of the character string is fragmented as set forth.

For example, applying the MCMV submethod to the correct character string "bannock", the first character string consists of the characters "ab" as the character pair "an" is the first vowel-consonant combination found. The second fragment therefore consists of the characters "nno", which is reduced to the character string "no". The final character fragment therefore consists of the characters "ck". These fragments are shown graphically in rows 17-20 of FIG. 9A.

Figure 6:
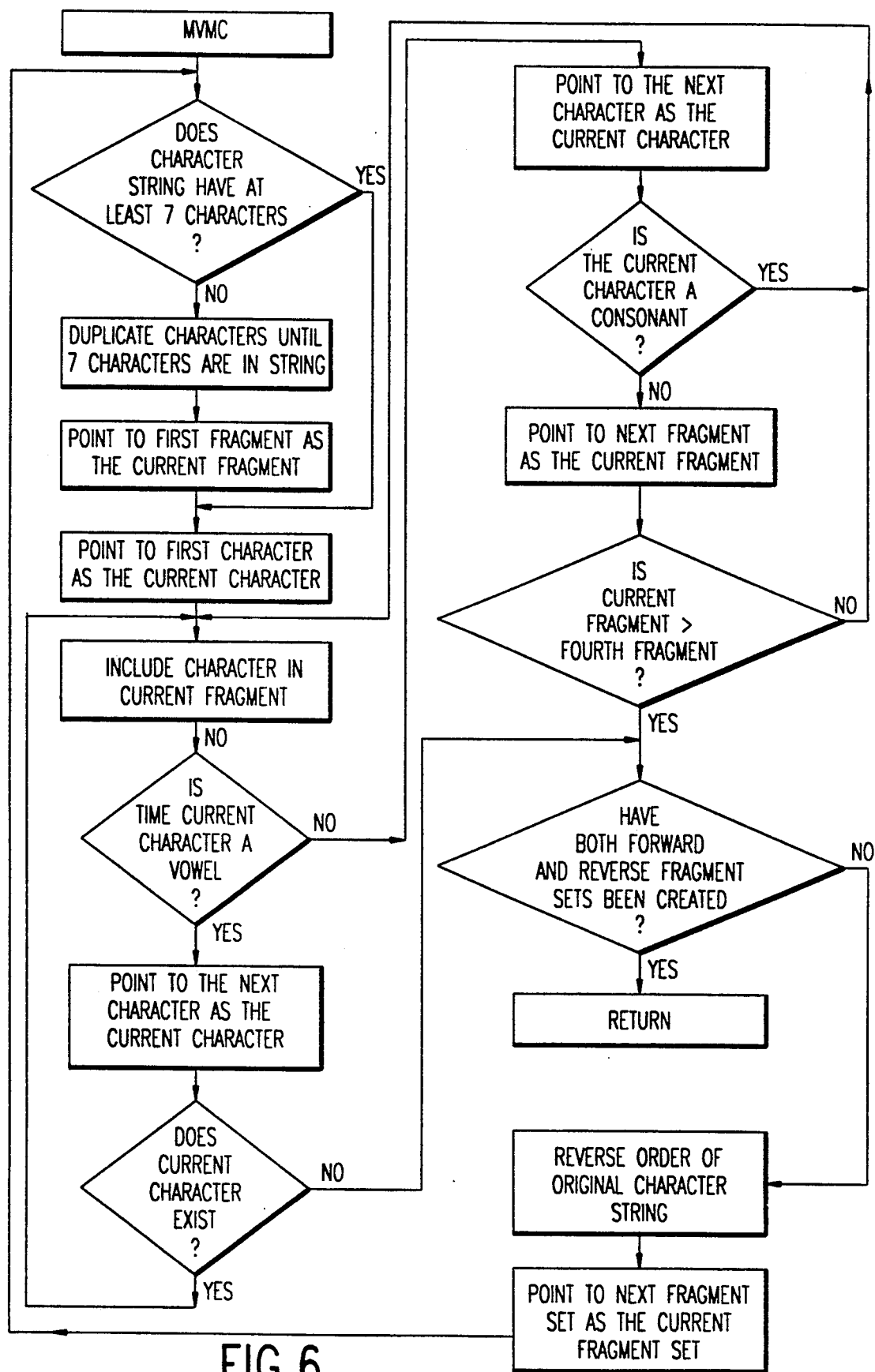
FIG. 6 is a flow chart of the MVMS submethod.
Figure 7:
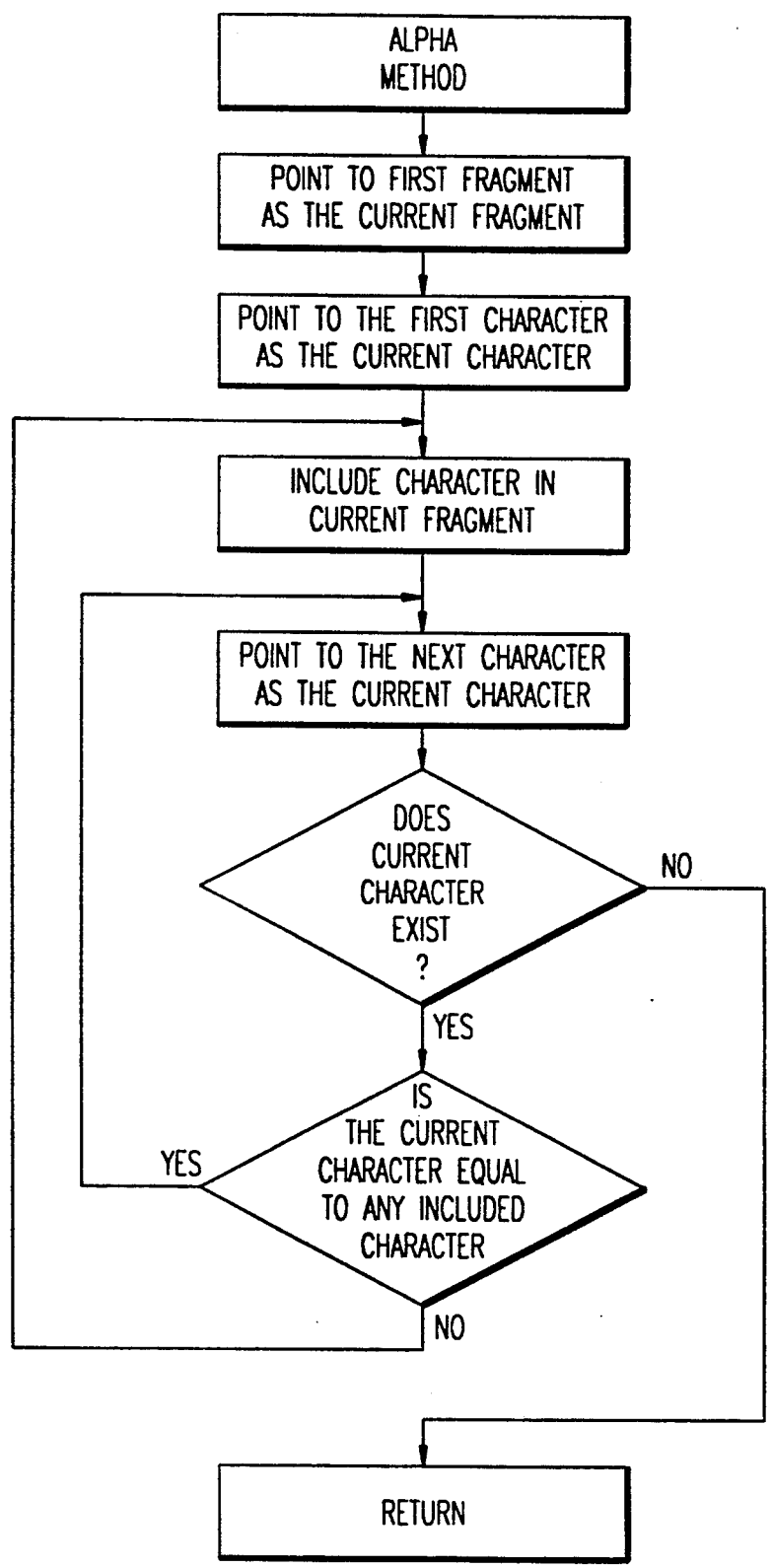
FIG. 7 is a flow chart of the ALPHA submethod.

The MVMC submethod shown in FIG. 6 is based on providing character string fragments which group into a single fragment strings of consecutive vowels, and any number of consonants following them. The character string fragments are formed by placing characters from the character string in the first fragment until a consonant followed by a vowel is found. The consonant-vowel combination is divided so that the consonant is placed in the current character string fragment while the vowel begins the next character string fragment. The characters are then placed in the next character string fragment until the next consonant-vowel combination is found and the process is repeated.

Applying the MVMC submethod to the correct character string "bannock", the first fragment consists of the letter "b", as the first consonant vowel combination are the characters "ba". The second fragment therefore consists of the characters "ann", which is reduced to the characters "an". The third fragment therefore consists of the characters "cko" and the forth fragment is empty. These fragments are shown graphically in rows 25-28 of FIG. 9A.

Close examination of the SVMC and the MVMC submethods for fragmenting the string "bannock" reveals that the character fragments generated are identical. This can be seen graphically by comparing rows 9-12 and rows 25-28 of FIG. 9A. This occurs because there are no groups of two or more consecutive vowels such as are found, for example, in the correct character string "iowairoquois". In contrast, the character string fragments for the correct character string "iowairoquois" under the SCMV and MCMV would also be identical as there are no groups of two or more consecutive consonants as are found in the correct character string "bannock".

The first preferred embodiment for determining the partial values and total values from the comparison of the uncorrected character string fragments and the fragments from the correct character strings will be described below in reference to comparisons between the uncorrected character string "bayock" and the correct character string "bannock". Applying the SCMV fragmentation method to the correct string "bannock", the character string fragments created are "ab", "n", "no", and "c". Applying the SCMV submethod to the uncorrected character string "bayock" produces the character string fragments "ab", "oy", "c"and "k" shown in rows 1-4 of FIG. 9B. Comparing the corresponding fragments produces fragment error counts of zero for the first fragment pair, three for the second fragments corresponding to the unmatched characters "o", "n", and "y", three for the third character fragments corresponding to the unmatched characters "c", "n", and "o" and two for the fourth character string fragment pair corresponding to the unmatched characters "c" and "k" as shown in rows 1-4 of FIG. 9C. This gives a partial value of eight for the set of character string fragments corresponding to the SCMV.

Applying the SVMC to the character string "bannock" produces the character string fragments "b", "an", "cko", and an empty fourth fragment. Applying the SVMC submethod to the uncorrected character string "bayock" 30 produces the character string fragments "b", "ay", "cko", and an empty fourth fragment as shown in rows 9-12 of FIG. 9B. Comparing the corresponding character string fragments, the first, third and fourth character string fragment pairs have no unmatched characters and produce a zero error count. A comparison of the second fragment produces the unmatched characters "n" and "y" as shown in row 10 of FIG. 9C, for an error count of two, and a partial value of two.

Applying the MCMV to the correct character string "bannock" places the character string fragments "ab", "no" "ck" and an empty fourth fragment Applying the MCMV submethod to the uncorrected character string "bayock" produces the fragments "ab", "oy", "ck", and an empty fourth fragment as shown in rows 17-20 of FIG. 9B. Comparing corresponding fragments produces an error count of zero for each of the first, third and fourth fragment pairs, as there are no unmatched characters. Comparing the second fragment produces an error count of two for the unmatched characters "n" and "y", as shown in row 18 of FIG. 9C and a partial value of two.

Applying the MVMC to the character strings "bannock" and "bayock" produces the same character fragments as the SVMC submethod as shown in rows 25-28 of FIG. 9B and row 26 of FIG. 9C. Accordingly, the error count for the MVMC submethod is two. Therefore, the lowest partial value for all the fragments is 2. Applying each of the four submethods from the ends of the character strings forward produces partial error values of 5 for the SCMV submethod, and 2 for each of the other submethods. Referring now to Appendix I, line 5, applying the method to the uncorrected character string "bayock", and using the right-most list in Appendix I which shows the correct character strings, the correct character string "bannock" is selected as the proper correction of the uncorrected character string "bayock". Line 4 gives an example where the wrong correct character string was chosen. The "48" in the last column means that "OKINAGA" was chosen instead of the correct "ASSINIBOINE".

One obvious disadvantage of the first preferred embodiment described above is the large amount of processor time consumed in a serial comparison of the multiple character string fragments for each of the submethods for each of the correct character strings with the multiple fragments of the submethods of the uncorrected character string. A number of other comparison methods are available to obviate this disadvantage.

In the first preferred embodiment of the comparison step, the comparison of two corresponding character fragments is made by implementing the comparison step in a highly parallel computer architecture. In this parallel architecture, an array row of at least 26 one-bit processors is provided for each character string fragment. Each bit of data input to each one-bit processor corresponds to the presence or absence of a character in that fragment. For example, applying the first preferred embodiment to the SVMC-generated fragments of the character strings "bannock" and "bayock" produces the input data arrays shown in lines 1-4 of FIGS. 9A and 9B, respectively, for an array of 32 rows of 32 bits. Loading all 32 fragments generated for each of the correct and uncorrected character strings requires a processor plane of 32 columns of 32 rows of parallel processors for each character string, as shown in FIGS. 9A-9B. Each 32×32 array of parallel processors is able to combine two input data planes as shown by FIGS. 9A and 9B, into one output data plane, as shown by FIGS. 9C or 9D.

The comparison step can then be provided by combining corresponding locations of the two input data planes by the logical "XOR" operation to produce the output data plane shown in FIG. 9C. By then adding the outputs of all of the one bit parallel processors for each of the eight groups of four rows, representing the 8 sets of fragments, the partial values for the fragment comparison of the strings "bannock" and "bayock" can be quickly generated. By providing 32 rows of the 32 one-bit processor rows, enough processors are supplied to simultaneously compare eight different character fragment sets for each of the uncorrected character string and the current correct character string, generated by the four preferred fragmentation submethods working in each direction, each set containing four character fragments of a uncorrected character string or a correct character string. In the first preferred embodiment the sum of the one bit in each group of four rows would be calculated simultaneously in a single machine cycle.

An alternative method would be to define a metric indicative of the total value in an abstract character space between the individual correct character strings, and storing the correct character string data in order according to this metric instead of alphabetically. In this way, if the total value between an uncorrected character string and a correct character string is small, then it is generally more probable that the total value will be small between the uncorrected character string and a second character string having, in metric space, a smaller difference between the first correct character string than a third correct character string having, in metric space, a large difference between the first character string. In this way, more efficient search strategies can be applied to further reduce the number of comparisons that need to be made between the uncorrected character string and obviously inappropriate correct character strings.

In a second preferred embodiment of the comparison step, after the 32 fragments for the correct and uncorrected character strings are provided as input into the processor plane, the fragments are compared by both an "XOR" logical operation and an "AND" logical operation. The result of the "XOR" comparison, shown in FIG. 9C, gives a positive or logical one result when characters in the two comparative fragments do not correspond, thereby generating a value for the "misses" between the two character string fragments. The result of the logical "AND" operation, shown in FIG. 9D for the fragments in FIGS. 9A and 9B, produces a positive or logical one result when the characters appear in both character string fragments, thereby generating a value for the "matches" between the character string fragments. By subtracting the "matches" from the "misses" a new error count giving an improved correction-toerror ratio for any given threshold is obtained. Appendix II shows a trial run using the second preferred embodiment of the fragmentation step. Alternatively, a third preferred embodiment uses only the "AND" operation to implement the comparison step to provide only a single comparison value equal to the "Matches".

In a second preferred embodiment of the identification and correction method, the four submethods of the first preferred embodiment are supplemented with a further character string fragmentation submethod, performed before the four previously disclosed submethods. This submethod is the "ALPHA" submethod. In the ALPHA submethod shown in FIG. 7, only a single character string fragment is created. The character string fragment includes all of the characters of the character string in alphabetical order with duplicate characters eliminated. In this second preferred embodiment, the correct character strings have also been previously fragmented by this submethod, and the results stored in memory. Like the other fragments generated, the comparison between the uncorrected character string ALPHA fragment and the correct character string ALPHA fragments can be implemented in the parallel architecture, but each unknown string can be compared with 32 different correct strings simultaneously. Also, the sums of the ones bits in each row would be computed simultaneously in a few machine cycles.

Figure 2B:
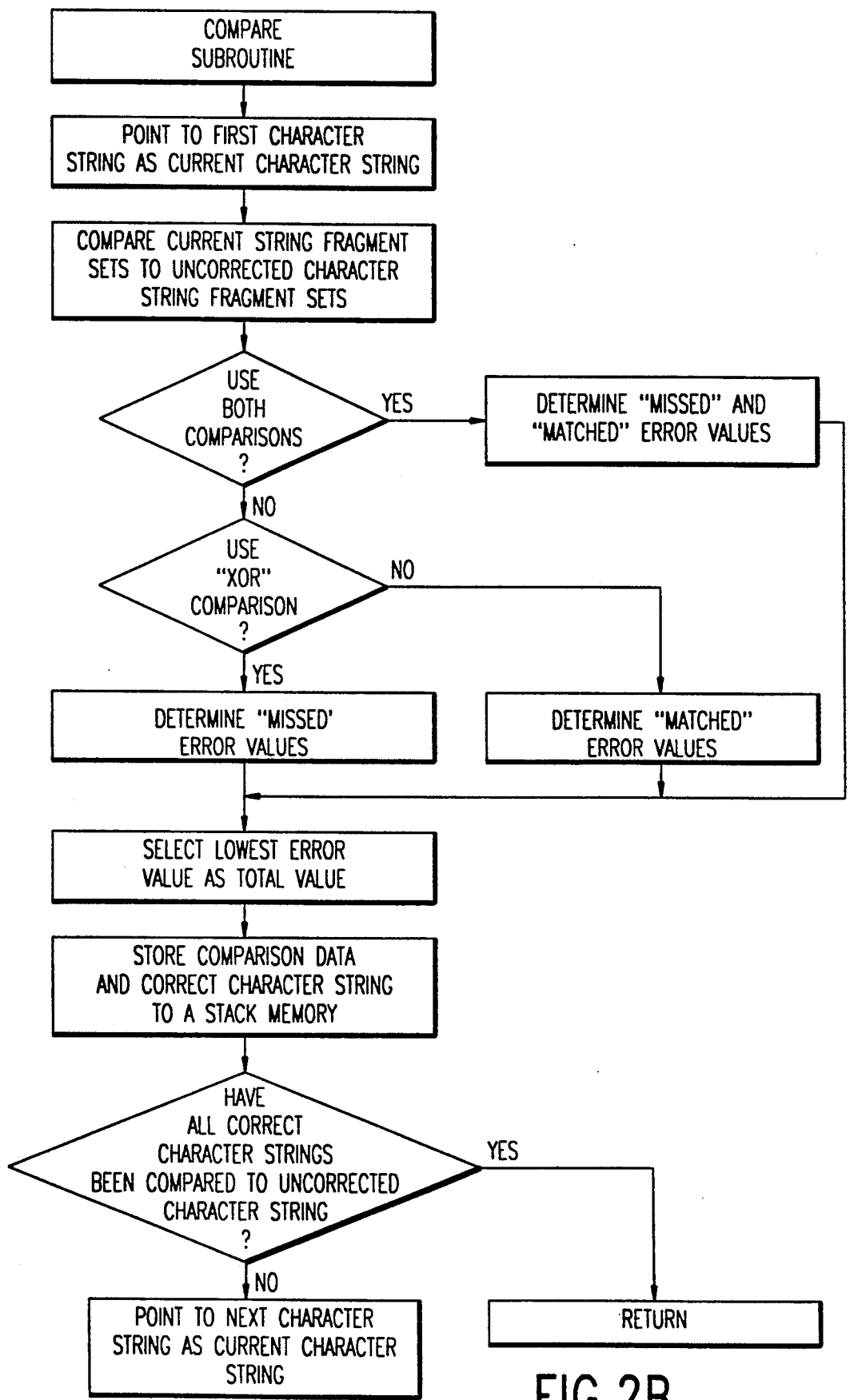

The ALPHA submethod allows the correct character strings to be pre-screened, so that only the most likely correct character sets are compared using the other four fragmentation submethods. The pre-screening step can either be implemented using a threshold to determine which correct character strings are stored in memory as the new list of predetermined character strings, as shown in FIG. 2A, or by saving the correct character strings having the lowest comparison values to a stack memory as shown in FIG. 2B.

Appendix II shows the application of the alpha method to a shortened list of character strings representing indian tribes. The leftmost column numerically identifies the correct character strings set forth in column 2. Column 3 provides a list of uncorrected character strings arranged opposite the corresponding correct character strings. Column 4 indicates, from the application of the ALPHA embodiment, which uncorrected strings could be positively identified and corrected, represented by a "0", and which uncorrected character strings cannot be positively identified, represented by a "1". Column 5 indicates which correct character string produces the lowest total value using the alpha method. Using the ALPHA embodiment, 14 of the uncorrected character strings were positively identified without error, and of the 37 other uncorrected character strings, only eight of the uncorrected character strings were misidentified.

Appendix I shows the results applying the SCMV et al. embodiment to the results generated by the ALPHA embodiment of Appendix II. Looking at column 4 of Appendix I, only two of the 51 uncorrected character strings could not be positively identified using a threshold value of three. In addition, of the two uncorrected character strings which were not under the threshold of three, one was also correctly identified. Of the 49 character strings which were positively identified, only two uncorrected character strings were misidentified. These two uncorrected character strings have an exceedingly high number of errors in them, and are used for demonstration purposes. In a much longer list of uncorrected character strings, the error rate using the SCMV et al. embodiment where the ALPHA embodiment was used to preselect the correct character strings, the error rate was only on the order of 1 to 2%. In a third preferred embodiment of the character string fragmentation step, a further fragmentation scheme, the "Digraph" submethod, is implemented. In the Digraph submethod, shown in FIG. 10, the character strings are fragmented into a plurality of exactly two-character fragments. Starting with the first character of a character string, each Digraph fragment is formed by including the current character and the next letter. The next Digraph fragment is then formed by taking the next character and the next plus one character and so on until all of the characters of the character string have been put into at least one Digraph fragment. The normal character alphabet can also be augmented by a 27th symbol, representative of a beginning-of-word or end-of-word condition. For example, the correct word "bannock" can be represented in the expanded alphabet as "&bannock&" where the "&" stands for the beginning-of-word and end-of-word condition. By augmenting short character strings with the extra character symbol, additional Digraph fragments are formed. For example, a three character string will have only two Digraph fragments in the unexpanded alphabet but will have four Digraph fragments in the expanded alphabet. Because the correction rate of the Digraph fragmentation submethod is highly dependent on the number of Digraph fragments created, the large percentage increase in Digraph fragments for small character strings available through the expanded alphabet increases the range of effectiveness of the Digraph submethod.

A third preferred embodiment of the comparison step, the comparison of the uncorrected character string Digraph fragments and the correct character string Digraph fragments, will be described in reference to a comparison between the uncorrected character string "bayock" and the correct character string "bannock". As described above, applying the Digraph fragmentation submethod using the expanded alphabet to fragment the correct character string "bannock" produces the Digraph fragments "&b", "ba", "an", "nn", "no", "oc", "ck", and "k&". In the Digraph submethod, each two-character Digraph is considered to be a new independent character. Accordingly, all of these new Digraph characters are placed in a single character fragment, in an alphabetized order.

Applying the Digraph fragmentation submethod to the uncorrected character string "bayock", using the expanded alphabet, produces the Digraph fragments "&b", "ba", "ay", "yo", "oc", "ck", and "k&". Again, the Digraph fragments are treated as independent characters, and are put into a single character fragment and alphabetized.

In the third preferred embodiment, the global ordering of the characters in the character string is disregarded, while in the first preferred embodiment, only the localized ordering of the characters in any single character fragment was disregarded. Therefore, the Digraph fragmentation submethod is equally insensitive to all possible types of OCR character error.

The Digraph fragmentation submethod is also able to use the data plane comparison embodiment disclosed above, although in a slightly different conceptual format. In the previous embodiment, the processor plane comprises a horizontal row of 32 processors, corresponding to the characters in a fragment, and the 32 rows of the processor plane correspond to the 32 different fragments. In the present embodiment, the 32 processors in each row now correspond to the second character in each Digraph fragment, while the 32 horizontal rows represent the first character of each Digraph fragment, as shown in FIGS. 11A-11D. Inputting the correct character string "bannock" Digraph fragments into the processor plane produces a first data plane as shown in FIG. 11A. The result from inputting the uncorrected character string "bayock" Digraph fragments into the processor plane produces a second data plane shown in FIG. 11B. Again, as set forth in the first preferred embodiment for determining the total values of the comparison, the contents of each processor in the first data plane can be "XOR"ed with the contents of the corresponding processor in the second data plane. The result of this is shown in FIG. 11C. When the contents of all the one bit processors in FIG. 11C are added, the result is the total "missed" value for this comparison.

Likewise, the third preferred embodiment for the determining step can be implemented by logically "AND"ing the data from a processor in the first data plane with the corresponding data from a processor in the second data plane to produce the data plane shown in FIG. 11D. Again, the data in the data plane shown in FIG. 11D is added to produce a total "matched" value, and the proper correct character string determined.

Finally, in accordance with the three preferred embodiments of the comparison step, the "matched" value produced by the "AND" operation can be subtracted from the "missed" value produced by the "XOR" operation to produce a combined value, or either one can be used by itself. This combined value can then be used to determine the proper correct character string.

Appendix III shows a trial run using the Digraph embodiment alone. Looking at column 4, the Digraph embodiment is able to positively identify 47 of the 51 uncorrected character strings. The results in Appendix III were generated using the second preferred embodiment of the comparing and determining step, and used a threshold of negative four, meaning that the "misses" value minus the "matches" value is less than four. In addition, of the four uncorrected character strings which were above the threshold, two were also correctly identified. Of the 47 positively identified uncorrected character strings, two errors were made. Again, as with Appendix II, the error rate on a longer list of uncorrected character strings having more realistic errors would be much lower.

Comparing the results of lines 18, 21 and 23 of Appendices I and III, the Digraph embodiment was able to positively identify the uncorrected character string "dvlta" as the correct character string "dakota" while the SCMV et al. embodiment was not able to positively identify this uncorrected character string. Conversely, in line 21, the Digraph embodiment was not able to correctly or positively identify the uncorrected character string "flatcp" for the correct string "flathead", while the SCMV et al. embodiment was able to correctly and positively identify this uncorrected character string. In line 23, both the Digraph embodiment and the SCMV et al. embodiment incorrectly identify the uncorrected character string "grgyqcre", but they do not identify the same correct character string. From this comparison, it is easy to see that the Digraph embodiment and SCMV et al. embodiment provide complementary results that can be used to increase the number of positively identified uncorrected character strings, or to decrease the errors in the number of positively identified uncorrected character strings, or both.

Also, the Digraph fragmentation submethod can also be combined with the alpha fragmentation submethod to permit pre-screening of the possible correct character strings by the alpha fragmentation method to produce the most probable correct character strings. Then, only these most probable correct character strings are analyzed using the Digraph fragmentation submethod. Finally, the correct character strings selected by the Digraph fragmentation submethod can be used as preselected input to the SCMV, SVMC, MCMV and MVMC submethods as the ALPHA method was for the other submethods.

| Appendix I | | | | |
|---|---|---|---|---|
| 0 | ALEUT | ALHYT | 0 | 0 |
| 1 | APACHE | CKPACHE | 0 | 1 |
| 2 | ARAPAHOE | ARAPAIOE | 0 | 2 |
| 3 | ARIKARA | YRIKARA | 0 | 3 |
| 4 | ASSINIBOINE | ANNIKINE | 0 | 48 |
| 5 | BANNOCK | BAYOCK | 0 | 5 |
| 6 | BELLACOOLA | BVWXOOLA | 0 | 6 |
| 7 | BLACKFOOT | TYLACIFOOT | 0 | 7 |
| 8 | CHEROKEE | CHEROKEV | 0 | 8 |
| 9 | CHEYENNE | CHECENRKY | 0 | 9 |
| 10 | CHICKASAW | CDICCASAVA | 0 | 10 |
| 11 | CHINOOK | CHINOKW | 0 | 11 |
| 12 | CHIPPEWA | CHIPPEWA | 0 | 12 |
| 13 | CHOCTAW | CHOCTYW | 0 | 13 |
| 14 | COMANCHE | COMANCHE | 0 | 14 |
| 15 | CREE | WTREE | 0 | 15 |
| 16 | CREEK | CREEK | 0 | 16 |
| 17 | CROW | CROW | 0 | 17 |
| 18 | DAKOTA | DVLTA | 0 | 18 |
| 19 | DELAWARE | DELAWARE | 0 | 19 |
| 20 | ESKIMO | ESKIMJ | 0 | 20 |
| 21 | FLATHEAD | FLATCP | 1 | 1 |
| 22 | FOX | FOX | 0 | 22 |
| 23 | GROSVENTRE | GRGYQCRE | 0 | 9 |
| 24 | HAIDA | HAIIA | 0 | 24 |
| 25 | HIDATSA | HIDPSA | 0 | 25 |
| 26 | HOPI | HOPI | 0 | 26 |
| 27 | HUPA | HDPA | 0 | 27 |
| 28 | IOWAIROQUOIS | IORAIROQUOIS | 0 | 28 |
| 29 | MOHAWK | MOHAWK | 0 | 29 |
| 30 | ONEIDA | INSDGA | 1 | 30 |
| 31 | ONODAGA | ONODAGG | 0 | 31 |
| 32 | CAYUGA | CAYUGA | 0 | 32 |
| 33 | SENECA | SENECN | 0 | 33 |
| 34 | KAROK | KARGK | 0 | 34 |
| 35 | KICKAPOO | KICKEDPOO | 0 | 35 |
| 36 | KIOWA | KXCOWA | 0 | 36 |
| 37 | KUTENAI | KUWMENAI | 0 | 37 |
| 38 | KWAKIUTL | KWHKIUHTL | 0 | 38 |
| 39 | MAIDU | MAIDU | 0 | 39 |
| 40 | MANDAN | MANZAP | 0 | 40 |
| 41 | MENOMINI | MQNHMINI | 0 | 41 |
| 42 | MISSION | MISSION | 0 | 42 |
| 43 | MOHICAN | MPMCCN | 0 | 43 |
| 44 | NAVAHO | NAZHO | 0 | 44 |
| 45 | NEZPERCE | NYQPERCE | 0 | 45 |
| 46 | NOOTKA | NOCTKA | 0 | 46 |
| 47 | OJIBWAY | OJIBWAY | 0 | 47 |
| 48 | OKINAGAN | OKINBJCSAG | 0 | 48 |
| 49 | OMAHA | OMAHA | 0 | 49 |
| 50 | SEMINOLE | SEINOLE | 0 | 50 |

| Appendix II | | | | |
|---|---|---|---|---|
| 0 | ALEUT | ALHYT | 1 | 0 |
| 1 | APACHE | CKPACHE | 1 | 1 |
| 2 | ARAPAHOE | ARAPAIOE | 1 | 2 |
| 3 | ARIKARA | YRIKARA | 1 | 3 |
| 4 | ASSINIBOINE | ANNIKINE | 1 | 37 |

Appendix II -continued

| | | | | |
|---|---|---|---|---|
| 5 | BANNOCK | BAYOCK | 1 | 5 |
| 6 | BELLACOOLA | BVWXOOLA | 1 | 6 |
| 7 | BLACKFOOT | TYLACIFOOT | 1 | 7 |
| 8 | CHEROKEE | CHEROKEV | 1 | 8 |
| 9 | CHEYENNE | CHECENRKY | 1 | 9 |
| 10 | CHICKASAW | CDICCASAVA | 1 | 10 |
| 11 | CHINOOK | CHINOKW | 1 | 11 |
| 12 | CHIPPEWA | CHIPPEWA | 0 | 12 |
| 13 | CHOCTAW | CHOCTYW | 1 | 13 |
| 14 | COMANCHE | COMANCHE | 0 | 14 |
| 15 | CREE | WTREE | 1 | 15 |
| 16 | CREEK | CREEK | 0 | 16 |
| 17 | CROW | CROW | 0 | 17 |
| 18 | DAKOTA | DVLTA | 1 | 0 |
| 19 | DELAWARE | DELAWARE | 0 | 19 |
| 20 | ESKIMO | ESKIMJ | 1 | 20 |
| 21 | FLATHEAD | FLATCP | 1 | 1 |
| 22 | FOX | FOX | 0 | 22 |
| 23 | GROSVENTRE | GRGYQCRE | 1 | 9 |
| 24 | HAIDA | HAIIA | 1 | 24 |
| 25 | HIDATSA | HIDPSA | 1 | 24 |
| 26 | HOPI | HOPI | 0 | 26 |
| 27 | HUPA | HDPA | 1 | 27 |
| 28 | IOWAIROQUOIS | IORAIROQUOIS | 1 | 28 |
| 29 | MOHAWK | MOHAWK | 0 | 29 |
| 30 | ONEIDA | INSDGA | 1 | 32 |
| 31 | ONODAGA | ONODAGG | 0 | 31 |
| 32 | CAYUGA | CAYUGA | 0 | 32 |
| 33 | SENECA | SENECN | 1 | 33 |
| 34 | KAROK | KARGK | 1 | 34 |
| 35 | KICKAPOO | KICKEDPOO | 1 | 35 |
| 36 | KIOWA | KXCOWA | 1 | 29 |
| 37 | KUTENAI | KUWMENAI | 1 | 37 |
| 38 | KWAKIUTL | KWHKIUHTL | 1 | 38 |
| 39 | MAIDU | MAIDU | 0 | 39 |
| 40 | MANDAN | MANZAP | 1 | 40 |
| 41 | MENOMINI | MQNHMINI | 1 | 41 |
| 42 | MISSION | MISSION | 0 | 42 |
| 43 | MOHICAN | MPMCCN | 1 | 40 |
| 44 | NAVAHO | NAZHO | 1 | 44 |
| 45 | NEZPERCE | NYQPERCE | 1 | 45 |
| 46 | NOOTKA | NOCTKA | 1 | 46 |
| 47 | OJIBWAY | OJIBWAY | 0 | 47 |
| 48 | OKINAGAN | OKINBJCSAG | 1 | 48 |
| 49 | OMAHA | OMAHA | 0 | 49 |
| 50 | SEMINOLE | SEINOLE | 1 | 50 |

Appendix III

| | | | | |
|---|---|---|---|---|
| 0 | ALEUT | ALHYT | 0 | 0 |
| 1 | APACHE | CKPACHE | 0 | 1 |
| 2 | ARAPAHOE | ARAPAIOE | 0 | 2 |
| 3 | ARIKARA | YRIKARA | 0 | 3 |
| 4 | ASSINIBOINE | ANNIKINE | 0 | 48 |
| 5 | BANNOCK | BAYOCK | 0 | 5 |
| 6 | BELLACOOLA | BVWXOOLA | 0 | 6 |
| 7 | BLACKFOOT | TYLACIFOOT | 0 | 7 |
| 8 | CHEROKEE | CHEROKEV | 0 | 8 |
| 9 | CHEYENNE | CHECENRKY | 0 | 9 |
| 10 | CHICKASAW | CDICCASAVA | 0 | 10 |
| 11 | CHINOOK | CHINOKW | 0 | 11 |
| 12 | CHIPPEWA | CHIPPEWA | 0 | 12 |
| 13 | CHOCTAW | CHOCTYW | 0 | 13 |
| 14 | COMANCHE | COMANCHE | 0 | 14 |
| 15 | CREE | WTREE | 1 | 15 |
| 16 | CREEK | CREEK | 0 | 16 |
| 17 | CROW | CROW | 0 | 17 |
| 18 | DAKOTA | DVLTA | 1 | 18 |
| 19 | DELAWARE | DELAWARE | 0 | 19 |
| 20 | ESKIMO | ESKIMJ | 0 | 20 |
| 21 | FLATHEAD | FLATCP | 0 | 21 |
| 22 | FOX | FOX | 0 | 22 |
| 23 | GROSVENTRE | GRGYQCRE | 1 | 19 |
| 24 | HAIDA | HAIIA | 0 | 24 |
| 25 | HIDATSA | HIDPSA | 0 | 25 |
| 26 | HOPI | HOPI | 0 | 26 |
| 27 | HUPA | HDPA | 0 | 27 |
| 28 | IOWAIROQUOIS | IORAIROQUOIS | 0 | 28 |

Appendix III -continued

| | | | | |
|---|---|---|---|---|
| 29 | MOHAWK | MOHAWK | 0 | 29 |
| 30 | ONEIDA | INSDGA | 1 | 32 |
| 31 | ONODAGA | ONODAGG | 0 | 31 |
| 32 | CAYUGA | CAYUGA | 0 | 32 |
| 33 | SENECA | SENECN | 0 | 33 |
| 34 | KAROK | KARGK | 0 | 34 |
| 35 | KICKAPOO | KICKEDPOO | 0 | 35 |
| 36 | KIOWA | KXCOWA | 0 | 36 |
| 37 | KUTENAI | KUWMENAI | 0 | 37 |
| 38 | KWAKIUTL | KWHKIUHTL | 0 | 38 |
| 39 | MAIDU | MAIDU | 0 | 39 |
| 40 | MANDAN | MANZAP | 0 | 40 |
| 41 | MENOMINI | MQNHMINI | 0 | 41 |
| 42 | MISSION | MISSION | 0 | 42 |
| 43 | MOHICAN | MPMCCN | 0 | 40 |
| 44 | NAVAHO | NAZHO | 0 | 44 |
| 45 | NEZPERCE | NYQPERCE | 0 | 45 |
| 46 | NOOTKA | NOCTKA | 0 | 46 |
| 47 | OJIBWAY | OJIBWAY | 0 | 47 |
| 48 | OKINAGAN | OKINBJCSAG | 0 | 48 |
| 49 | OMAHA | OMAHA | 0 | 49 |
| 50 | SEMINOLE | SEINOLE | 0 | 50 |

What is claimed is:

1. A method of analyzing an uncorrected character string generated by an input device, comprising the steps of:

dividing the uncorrected character string into at least one set of uncorrected character string fragments by use of at least one predetermined submethod;

successively selecting at least one correct character string from a predetermined list of correct character strings as at least one current correct character string, comparing, for each current correct character string and each set of uncorrected character string fragments, a predetermined set of correct character string fragments to the corresponding set of uncorrected character string fragments to generate an error value for each predetermined set of correct character string fragments, wherein each predetermined set of correct character string fragments is generated by one predetermined submethod;

selecting, for each current correct character string, a lower error value from the generated error values as a corresponding total value for the current correct character string;

storing at least one current correct character string and the corresponding total value to a storage means; and transferring the contents of the storage device to an appropriate output device upon reaching an end of the list of correct character strings;

wherein characters in the correct and uncorrected character string fragments are placed in a predetermined order without regard to ordering of the characters in the correct and uncorrected character strings, respectively.

2. The method of claim 1, wherein the step of transferring at least one correct string further comprises the steps of:

selecting one correct character string from the predetermined list of correct character strings which has a unique and a lowest total value; and transferring the selected correct character string to the output device for the uncorrected character string when the total value of the selected correct character string is below a predetermined threshold value.

3. A method of analyzing an uncorrected character string generated by an input device, comprising the steps of:

dividing the uncorrected character string into at least one set of uncorrected character string fragments by use of at least one predetermined submethod;

successively selecting at least one correct character string from a predetermined list of correct character strings as at least one current correct character string, comparing, for each current correct character string and each set of uncorrected character string fragments, a predetermined set of correct character string fragments to the corresponding set of uncorrected character string fragments to generate an error value for each predetermined set of correct character string fragments, wherein each predetermined set of correct character string fragments is generated by one predetermined submethod;

selecting, for each current correct character string, a lowest error value from the generated error values as a corresponding total value for the current correct character string;

storing at least one current correct character string and the corresponding total value to a storage means; and transferring the contents of the storage device to an appropriate output device upon reaching an end of the list of correct character strings, wherein the corrected and uncorrected character strings are divided into no more than a predetermined number character string fragments.

4. A method of analyzing an uncorrected character string generated by an input device, comprising the steps of:

dividing the uncorrected character string into at least one set of uncorrected character string fragments by use of at least one predetermined submethod;

successively selecting at least one correct character string from a predetermined list of correct character strings as at least one current correct character string, comparing, for each current correct character string and each set of uncorrected character string fragments, a predetermined set of correct character string fragments to the corresponding set of uncorrected character string fragments to generate an error value for each predetermined set of correct character string fragments, wherein each predetermined set of correct character string fragments is generated by one predetermined submethod;

selecting, for each current correct character string, a lowest error value from the generated error values as a corresponding total value for the current correct character string;

storing at least one current correct character string and the corresponding total value to a storage means; and transferring the contents of the storage device to an appropriate output device upon reaching an end of the list of correct character strings, wherein duplicate characters are added to a character string until a specified number of characters comprise the character string.

5. A method of analyzing an uncorrected character string generated by an input device, comprising the steps of:

dividing the uncorrected character string into at least one set of uncorrected character string fragments by use of at least one predetermined submethod;

successively selecting at least one correct character string from a predetermined list of correct character strings as at least one current character string, comparing, for each current correct character string and each set of uncorrected character string fragments, a predetermined set of correct character string fragments to the corresponding set of uncorrected character string fragments to generate an error value for each predetermined set of correct character string fragments, wherein each predetermined set of correct character string fragments is generated by one predetermined submethod;

selecting, for each current correct character string, a lowest error value from the generated error values as a corresponding total values for the current correct character string;

storing at least one current correct character string and the corresponding total value to a storage means; and transferring the contents of the storage device to an appropriate output device upon reaching an end of the list of correct character strings, wherein one predetermined submethod comprises the steps of:

generating a first character string fragment by including all the characters of the character string up to but excluding a first consonant;

generating a next character string fragment by including the consonant and all subsequent characters of the character string up to but excluding a next consonant; and repeating the next character string fragment generating step until the first of all the characters being included in a character string fragment and a predetermined number of character string fragments being generated occurs.

6. The method of claim 5, further comprising the step of deleting all characters duplicated within a single character string fragment.

7. A method of analyzing an uncorrected character string generated by an input device, comprising the steps of:

dividing the uncorrected character string into at least one set of uncorrected character string fragments by use of at least one predetermined submethod;

successively selecting at least one correct character string from a predetermined list of correct character strings as at least one current correct character string, comparing, for each current correct character string and each set of uncorrected character string fragments, a predetermined set of correct character string fragments to the corresponding set of uncorrected character string fragments to generate an error value for each predetermined set of correct character string fragments, wherein each predetermined set of correct character string fragments is generated by one predetermined submethod;

selecting, for each current correct character string, a lowest error value from the generated error values as a corresponding total value for the current correct character string;

storing at least one current correct character string and the corresponding total value to a storage means; and transferring the contents of the storage device to an appropriate output device upon reaching an end of the list of correct character strings, wherein one predetermined submethod comprises the steps of:

generating a first character string fragment by including all the characters of the character string up to but excluding a first vowel;

generating a next character string fragment by including the vowel and all subsequent characters up to but excluding a next vowel; and repeating the next character string fragment generating step until the first of all the characters being included in a character string fragment and a predetermined number of character string fragments being generated occurs.

8. The method of claim 7, further comprising the step of deleting all characters duplicated within a single character string fragment.

9. A method of analyzing an uncorrected character string generated by an input device, comprising the steps of:

dividing the uncorrected character string into at least one set of uncorrected character string fragments by use of at least one predetermined submethod;

successively selecting at least one correct character string from a predetermined list of correct character strings as at least one current correct character string, comparing, for each current correct character string and each set of uncorrected character string fragments, a predetermined set of correct character string fragments to the corresponding set of uncorrected character string fragments to generate an error value for each predetermined set of correct character string fragments, wherein each predetermined set of correct character string fragments is generated by one predetermined submethod;

selecting, for each current correct character string, a lowest error value from the generated error value as a corresponding total value for the current correct character string;

storing at least one current correct character string and the corresponding total value to a storage means; and transferring the contents of the storage device to an appropriate output device upon reaching an end of the list of correct character strings, wherein one predetermined submethod comprises the steps of:

generating a first character string fragment by including all the characters of the string up to a first vowel-consonant combination;

including the vowel in the current fragment;

generating a next character string fragment by including the consonant in the next fragment and all subsequent characters up to a next vowel-consonant combination; and repeating the including and next character string fragment generates steps until the first of all the character string of the characters string being included in a character string fragment and a predetermined number of character string fragments being generated occurs.

10. The method of claim 9, further comprising the step of deleting all characters duplicated within a single character string fragment.

11. A method of analyzing an uncorrected character string generated by an input device, comprising the steps of:

dividing the uncorrected character string into at least one set of uncorrected character string fragments by use of at least one predetermined submethod;

successively selecting at least one correct character string from a predetermined list of correct character strings as at least one current correct character string, comparing, for each current correct character string and each set of uncorrected character string fragments, a predetermined set of correct character string fragments to the corresponding set of uncorrected character string fragments to generate an error value for each predetermined sep of correct character string fragments, wherein each predetermined set of correct character string fragments is generated by one predetermined submethod;

selecting, for each current correct character string, a lowest error value from the generated error values as a corresponding total value for the current correct character string;

storing at least one current correct character string and the corresponding total value to a storage means; and transferring the contents of the storage device to an appropriate output device upon reaching an end of the list of correct character strings, wherein one predetermined submethod comprises the steps of:

generating a first character strings fragment by including all the characters of the string up to a first consonant-vowel combination;

including the consonant in the current fragment;

generating a next character string fragment by including the vowel in the next fragment and all subsequent characters up to a next consonant-vowel combination; and repeating the including and next character string fragment generating steps until the first of all the characters of the character string being included in a character string fragment and a predetermined number of character string fragments being generated occurs.

12. The method of claim 11, further comprising the step of deleting all characters duplicated within a single character string fragment.

13. A method of analyzing an uncorrected character string generated by an input device, comprising the steps of:

dividing the uncorrected character string into at least one set of uncorrected character string fragments by use of at least one predetermined submethod;

successively selecting at least one correct character string from a predetermined list of correct character strings as at least one current correct character string, comparing, for each current correct character string and each set of uncorrected character string fragments, a predetermined set of correct character string fragments to the corresponding set of uncorrected character string fragments to generate an error value for each predetermined set of correct character string fragments, wherein each predetermined set of correct character string fragments is generated by one predetermined submethod;

selecting, for each current correct character string, a lowest error value from the generated error values as a corresponding total value for the current correct character string;

storing at least one current correct character string and the corresponding total value to a storage means; and transferring the contents of the storage device to an appropriate output device upon reaching an end of the list of correct character strings, wherein one predetermined submethod comprises the steps of:

generating a first digraph character by including a first character and a next character of the character string;

generating a next digraph character by including the next character and a next plus one character of the character string; and repeating the next digraph character generating step until all the characters of the character string are in at least one digraph character.

14. The method of claim 13, further comprising the step of enhancing, prior to generating the first digraph character, character strings by appending a beginning or end of word symbol to the beginning and end of the character string.

15. A method of analyzing an uncorrected character string generated by an input device, comprising the steps of:

dividing the uncorrected character string into at least one set of uncorrected character string fragments by use of at least one predetermined submethod;

successively selecting at least one correct character string from a predetermined list of correct character string as at least one current correct character string, comparing, for each current correct character string and each set of uncorrected character string fragments, a predetermined set of correct character string fragments to the corresponding set of uncorrected character string fragments to generate an error value for each predetermined set of correct character string fragments, wherein each predetermined set of correct character string fragments is generated by one predetermined submethod;

selecting, for each current correct character string, a lowest error value from the generated error values as a corresponding total value for the current correct character string;

storing at least one current correct character string and the corresponding total value to a storage means; and transferring the contents of the storage device to an appropriate output device upon reaching an end of the list of correct character strings, wherein one predetermined submethod comprises the steps of:

of eliminating duplicate characters from the character strings and;

reordering the characters of each of the character strings in alphabetical order.

16. A method of analyzing an uncorrected character string generated by an input device, comprising the steps of:

dividing the uncorrected character string into at least one set of uncorrected character string fragments by use of at least one predetermined submethod;

successively selecting at least one correct character string from a predetermined list of correct character strings as at least one current correct character string, comparing, for each current correct character string and each set of uncorrected character string fragments, a predetermined set of correct character string fragments to the corresponding set of uncorrected character string fragments to generate an error value for each predetermined set of correct character string fragments, wherein each predetermined set of correct character string fragments is generated by one predetermined submethod;

selecting, for each current correct character string, a lowest error value from the generated error values as a corresponding total value for the current correct character string;

storing at least one current correct character string and the corresponding total value to a storage means; and transferring the contents of the storage device to an appropriate output device upon reaching an end of the list of correct character strings; and further comprising the steps of:

selecting another predetermined submethod to preselect most probable correct character strings;

performing the comparison and selection steps on the list of predetermined correct character strings, using the selected submethod to determine the most probable correct character strings;

storing the most probable correct character strings as a new list of predetermined correct character strings; and using the new list in place of the original list for remaining submethods.

17. A method of analyzing an uncorrected character string generated by an input device, comprising the steps of:

dividing the uncorrected character string into at least one set of uncorrected character string fragments by use of at least one predetermined submethod;

successively selecting at least one correct character string from a predetermined list of correct character strings as at least one current correct character string, comparing, for each current correct character string and each set of uncorrected character string fragments, a predetermined set of correct character string fragments to the corresponding set of uncorrected character string fragments to generate an error value for each predetermined set of correct character string fragments, wherein each predetermined set of correct character string fragments is generated by one predetermined submethod;

selecting, for each current correct character string, a lowest error value from the generated error values as a corresponding total value for the current correct character string;

storing at least one current correct character string and the corresponding total value to a storage means; and transferring the contents of the storage device to an appropriate output device upon reaching an end of the list of correct character strings, wherein the step of comparing the sets of correct and uncorrect character string fragments comprises the steps of:

loading all of the correct character string fragments into a first input data plane of a processor plane of 1-bit parallel processors;

loading all of the uncorrected character string fragments into a second input data plane of the processor plane;

outputting results from at least one logical combination of corresponding locations on the first and second input data planes to an output data plane of the processor plane; and parallely summing the results of the output data plane for each logical combination.

18. The method of claim 17, wherein the at least one logical operation is at least one of a logical XOR operation and a logical AND operation.

19. A method of analyzing an uncorrected character string, comprising the steps of:

scanning a hand-completed form with a scanner;

outputting signals from the scanner to an optical character recognition system;

converting the scanner signals to an uncorrected string of character data;

storing the uncorrected character string in a memory;

dividing the uncorrected character string into at least one set of uncorrected character string fragments by use of at least one predetermined submethod;

successively selecting at least one correct character string from a predetermined list of correct character strings as at least one current correct character string, comparing, for each current correct character string and each set of uncorrected character string fragments, a predetermined set of correct character string fragments to the corresponding set of uncorrected character string fragments to generate an error value for each predetermined set of correct character string fragments, wherein each predetermined set of correct character string fragments is generated by one predetermined submethod;

selecting, for each current correct character string, a lowest error value from the generated error values as a corresponding total value for the current correct character string;

storing at least one current correct character string and the corresponding total value to a storage means;

transferring the contents of the storage device to an appropriate output device upon reaching an end of the list of correct character strings.

20. The method of claim 1, wherein the predetermined order is alphabetical order.

21. The method of claim 3, wherein the predetermined number of character string fragments is 4.

* * * * *